United States Patent
Goudy et al.

(10) Patent No.: US 9,776,630 B2
(45) Date of Patent: Oct. 3, 2017

(54) VEHICLE OPERATION BASED ON CONVERGING TIME

(71) Applicant: NISSAN NORTH AMERICA, INC., Franklin, TN (US)

(72) Inventors: Roy Goudy, Farmington Hills, MI (US); Neal Probert, Farmington Hills, MI (US); Jeremy Chambers, Casco, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/056,480

(22) Filed: Feb. 29, 2016

(65) Prior Publication Data

US 2017/0247028 A1    Aug. 31, 2017

(51) Int. Cl.
*B60W 30/08*    (2012.01)
*B60Q 9/00*    (2006.01)

(52) U.S. Cl.
CPC ............ *B60W 30/08* (2013.01); *B60Q 9/008* (2013.01); *B60W 2520/00* (2013.01)

(58) Field of Classification Search
CPC . B60W 30/08; G08G 1/162; G08G 1/096716; G08G 1/00; G08G 1/163;
(Continued)

(56) References Cited

U.S. PATENT DOCUMENTS

| 4,667,334 A | 5/1987 | Collec et al. |
| 5,640,323 A | 6/1997 | Kleimenhagen et al. |

(Continued)

FOREIGN PATENT DOCUMENTS

| JP | 05155291 A | * | 6/1993 | ............ B60Q 9/008 |
| JP | 2001118199 A | | 4/2001 | |
| JP | 2003051099 A | | 2/2003 | |

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of The Ohio State University, Mar. 2012, UMI/Proquest Pub. No. 3497707, 136 pages.

(Continued)

*Primary Examiner* — Yuri Kan
(74) *Attorney, Agent, or Firm* — Young Basile Hanlon & MacFarlane, P.C.

(57) ABSTRACT

Operating a host vehicle is described as including receiving remote vehicle information indicating a geospatial state and a kinematic state for a remote vehicle, identifying host vehicle information indicating a geospatial state and a kinematic state for the host vehicle, determining a converging time to a converging location within a vehicle transportation network based on the remote vehicle information and the host vehicle information, identifying a first threshold at which a fixed deceleration of the host vehicle to the converging location is achieved using a reaction delay of an operator of the host vehicle, wherein the first threshold is a step-wise function based on the kinematic state of the host vehicle, and modifying operation of the host vehicle responsive to the converging time reaching the first threshold. A method, vehicle, and apparatus are described.

20 Claims, 14 Drawing Sheets

(58) Field of Classification Search
CPC ........ G08G 1/0965; B60Q 1/00; B60Q 9/008; B60Q 1/44; B60T 1/10
See application file for complete search history.

(56) References Cited

U.S. PATENT DOCUMENTS

| | | | |
|---|---|---|---|
| 5,939,976 A | 8/1999 | Sasaki et al. | |
| 5,940,010 A | 8/1999 | Sasaki et al. | |
| 6,008,741 A | 12/1999 | Shinagawa et al. | |
| 6,049,269 A | 4/2000 | Byrd et al. | |
| 6,236,337 B1 | 5/2001 | Beier et al. | |
| 6,289,332 B2 | 9/2001 | Menig et al. | |
| 6,529,831 B1* | 3/2003 | Smith | G08G 1/162 340/903 |
| 6,567,035 B1 | 5/2003 | Elliott | |
| 6,603,406 B2 | 8/2003 | Jambhekar et al. | |
| 6,615,137 B2 | 9/2003 | Lutter et al. | |
| 6,700,504 B1 | 3/2004 | Aslandogan et al. | |
| 6,720,898 B1 | 4/2004 | Ostrem | |
| 6,759,942 B2 | 7/2004 | Bedi et al. | |
| 6,791,471 B2 | 9/2004 | Wehner et al. | |
| 6,810,328 B2 | 10/2004 | Yokota et al. | |
| 6,985,089 B2 | 1/2006 | Liu et al. | |
| 7,188,026 B2 | 3/2007 | Tzamaloukas | |
| 7,190,260 B2 | 3/2007 | Rast | |
| 7,295,925 B2 | 11/2007 | Breed et al. | |
| 7,418,346 B2 | 8/2008 | Breed et al. | |
| 7,835,396 B2 | 11/2010 | Nagura | |
| 7,991,551 B2 | 8/2011 | Samuel et al. | |
| 7,994,902 B2 | 8/2011 | Avery et al. | |
| 8,000,897 B2 | 8/2011 | Breed et al. | |
| 8,169,338 B2 | 5/2012 | Mudalige | |
| 8,175,796 B1 | 5/2012 | Blackburn et al. | |
| 8,229,350 B2 | 7/2012 | Smith, Jr. et al. | |
| 8,229,663 B2 | 7/2012 | Zeng et al. | |
| 8,314,718 B2 | 11/2012 | Muthaiah et al. | |
| 8,340,894 B2 | 12/2012 | Yester | |
| 8,451,732 B2 | 5/2013 | Nagura | |
| 8,466,807 B2 | 6/2013 | Mudalige | |
| 8,499,155 B2 | 7/2013 | Kherani et al. | |
| 8,520,695 B1 | 8/2013 | Rubin et al. | |
| 8,548,729 B2 | 10/2013 | Mizuguchi | |
| 8,577,550 B2 | 11/2013 | Lu et al. | |
| 8,587,418 B2 | 11/2013 | Mochizuki et al. | |
| 8,639,426 B2 | 1/2014 | Dedes et al. | |
| 8,648,709 B2 | 2/2014 | Gauger et al. | |
| 8,675,603 B2 | 3/2014 | Lee et al. | |
| 8,717,192 B2 | 5/2014 | Durekovic et al. | |
| 8,848,608 B1 | 9/2014 | Addepalli et al. | |
| 8,948,044 B2 | 2/2015 | Bansal et al. | |
| 9,173,156 B2 | 10/2015 | Bai et al. | |
| 9,214,086 B1 | 12/2015 | Onishi | |
| 9,227,595 B2 | 1/2016 | Yang et al. | |
| 9,229,088 B2 | 1/2016 | Cheng et al. | |
| 9,241,249 B2 | 1/2016 | Yang et al. | |
| 9,251,630 B2 | 2/2016 | Denny et al. | |
| 9,297,891 B2 | 3/2016 | Karl | |
| 9,297,892 B2 | 3/2016 | Smith et al. | |
| 9,392,486 B2 | 7/2016 | Bai et al. | |
| 9,449,515 B2 | 9/2016 | Rubin et al. | |
| 2001/0044697 A1 | 11/2001 | Kageyama | |
| 2002/0198632 A1 | 12/2002 | Breed et al. | |
| 2005/0134440 A1 | 6/2005 | Breed | |
| 2006/0015231 A1 | 1/2006 | Yoshimura et al. | |
| 2006/0052909 A1* | 3/2006 | Cherouny | B60K 28/063 701/1 |
| 2007/0040666 A1* | 2/2007 | Lenehan | B60Q 1/44 340/479 |
| 2007/0050130 A1* | 3/2007 | Grimm | G08G 1/096716 701/420 |
| 2007/0109111 A1 | 5/2007 | Breed et al. | |
| 2007/0262881 A1 | 11/2007 | Taylor | |
| 2008/0037577 A1 | 2/2008 | Nagura | |
| 2009/0005988 A1* | 1/2009 | Sterling | G08G 1/0965 701/301 |
| 2009/0033540 A1 | 2/2009 | Breed et al. | |
| 2009/0140887 A1 | 6/2009 | Breed et al. | |
| 2009/0198412 A1 | 8/2009 | Shiraki | |
| 2010/0019891 A1* | 1/2010 | Mudalige | G08G 1/163 340/425.5 |
| 2010/0094509 A1 | 4/2010 | Luke et al. | |
| 2010/0169009 A1 | 7/2010 | Breed et al. | |
| 2010/0198513 A1 | 8/2010 | Zeng et al. | |
| 2010/0248618 A1 | 9/2010 | Bai et al. | |
| 2011/0080302 A1 | 4/2011 | Muthaiah et al. | |
| 2011/0087433 A1 | 4/2011 | Yester | |
| 2011/0128902 A1 | 6/2011 | Guo | |
| 2011/0238259 A1 | 9/2011 | Bai et al. | |
| 2011/0248843 A1* | 10/2011 | Myler | G08G 1/0965 340/438 |
| 2011/0313633 A1* | 12/2011 | Nath | G08G 1/163 701/70 |
| 2012/0016581 A1 | 1/2012 | Mochizuki et al. | |
| 2012/0025965 A1 | 2/2012 | Mochizuki et al. | |
| 2012/0215381 A1 | 8/2012 | Wang et al. | |
| 2012/0218093 A1 | 8/2012 | Yoshizawa et al. | |
| 2013/0015984 A1 | 1/2013 | Yamashiro | |
| 2013/0099911 A1 | 4/2013 | Mudalige et al. | |
| 2013/0116915 A1 | 5/2013 | Ferreira et al. | |
| 2013/0154853 A1 | 6/2013 | Chen | |
| 2013/0179047 A1 | 7/2013 | Miller et al. | |
| 2013/0278440 A1 | 10/2013 | Rubin et al. | |
| 2013/0278441 A1 | 10/2013 | Rubin et al. | |
| 2013/0278443 A1 | 10/2013 | Rubin et al. | |
| 2013/0279491 A1 | 10/2013 | Rubin et al. | |
| 2013/0282277 A1 | 10/2013 | Rubin et al. | |
| 2013/0297195 A1 | 11/2013 | Das et al. | |
| 2014/0074388 A1* | 3/2014 | Bretzigheimer | B60T 1/10 701/117 |
| 2014/0307628 A1 | 10/2014 | Stahlin et al. | |
| 2014/0347486 A1 | 11/2014 | Okouneva | |
| 2015/0078291 A1 | 3/2015 | Guner | |
| 2015/0197248 A1 | 7/2015 | Breed et al. | |
| 2015/0200957 A1 | 7/2015 | Zhang et al. | |
| 2015/0348412 A1 | 12/2015 | Onishi | |

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

* cited by examiner

VEHICLE OPERATION BASED ON CONVERGING TIME

TECHNICAL FIELD

This disclosure relates to the field of vehicle warning systems, and in particular to operating a vehicle based on a converging time to a remote vehicle.

BACKGROUND

Computerization of certain aspects of vehicles has led to a shift from completely manual control of vehicles to vehicles in which drivers are provided with varying levels of assistance. Some systems are passive in nature. In a passive system, a condition is detected, and the driver is warned of the condition. Other systems are active in nature. In an active system, a condition is detected and the vehicle assumes control of a certain system or modifies the control inputs made by the driver.

Some driver assistance systems are intended to warn drivers as to potential collisions. Collision warning systems that are currently in wide use rely on detection and ranging systems that utilize technologies such as Sonar, Radar, and Lidar. The signals generated by the detection and ranging system are used as a basis for determining whether a collision is imminent. While these systems work well for stationary objects, they can be largely inadequate for vehicle collision avoidance, as they require line of sight to the other vehicle, and cannot make a determination of driver intent.

Some current research and development efforts are directed to collision warning systems that are based on vehicle-to-vehicle (V2V) communications. Since V2V communication does not require line of sight, it provides a distinct advantage over detection and ranging systems. One example of V2V communication is a system in which vehicles exchange a basic safety message or "BSM." The BSM that is broadcast by a vehicle can contain a number of data elements that describe various aspects of the operation of the vehicle or provide information about the vehicle itself. As one example, the BSM can include location and trajectory information. As another example, the BSM can include information that describes the vehicle type and size for the vehicle.

SUMMARY

Disclosed herein are vehicle intersection warning and informative systems.

One aspect of the disclosure is a method for operating a host vehicle. The method includes receiving remote vehicle information indicating a geospatial state and a kinematic state for a remote vehicle, identifying host vehicle information indicating a geospatial state and a kinematic state for the host vehicle, and determining a converging time to a converging location within a vehicle transportation network based on the remote vehicle information and the host vehicle information. The method also includes identifying a first threshold at which a fixed deceleration of the host vehicle to the converging location is achieved using a reaction delay of an operator of the host vehicle, wherein the first threshold is a step-wise (also called a step) function based on the kinematic state of the host vehicle, and modifying operation of the host vehicle responsive to the converging time reaching the first threshold.

Another aspect of the disclosure is a vehicle that includes a transmission system, a sensor, and an operation system to operate the vehicle. The operation system is configured to receive remote vehicle information indicating a geospatial state and a kinematic state for a remote vehicle, identify, using the sensor, host vehicle information indicating geospatial state and kinematic state for the vehicle, determine a converging time to a converging location within a vehicle transportation network based on the remote vehicle information and the host vehicle information, and identify a first threshold at which a fixed deceleration of the vehicle to the converging location is achieved using a reaction delay of an operator of the vehicle. The first threshold is a step function based on the kinematic state of the vehicle. The operation system is also configured to modify operation of the vehicle responsive to the converging time reaching the first threshold.

Another aspect of this disclosure is an apparatus for controlling a host vehicle. The apparatus includes a processor and memory storing instructions that cause the processor to perform a method comprising receiving remote vehicle information indicating a geospatial state and a kinematic state for a remote vehicle, identifying host vehicle information indicating a geospatial state and a kinematic state for the host vehicle, determining a converging time to a converging location within a vehicle transportation network based on the remote vehicle information and the host vehicle information, identifying a first threshold at which a fixed deceleration of the host vehicle to the converging location is achieved using a reaction delay of an operator of the host vehicle, and modifying operation of the host vehicle responsive to the converging time reaching the first threshold. The first threshold is a step function based on the kinematic state of the host vehicle.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. In the drawings, like numbers refer to like elements unless stated otherwise.

DETAILED DESCRIPTION

Figure 1:
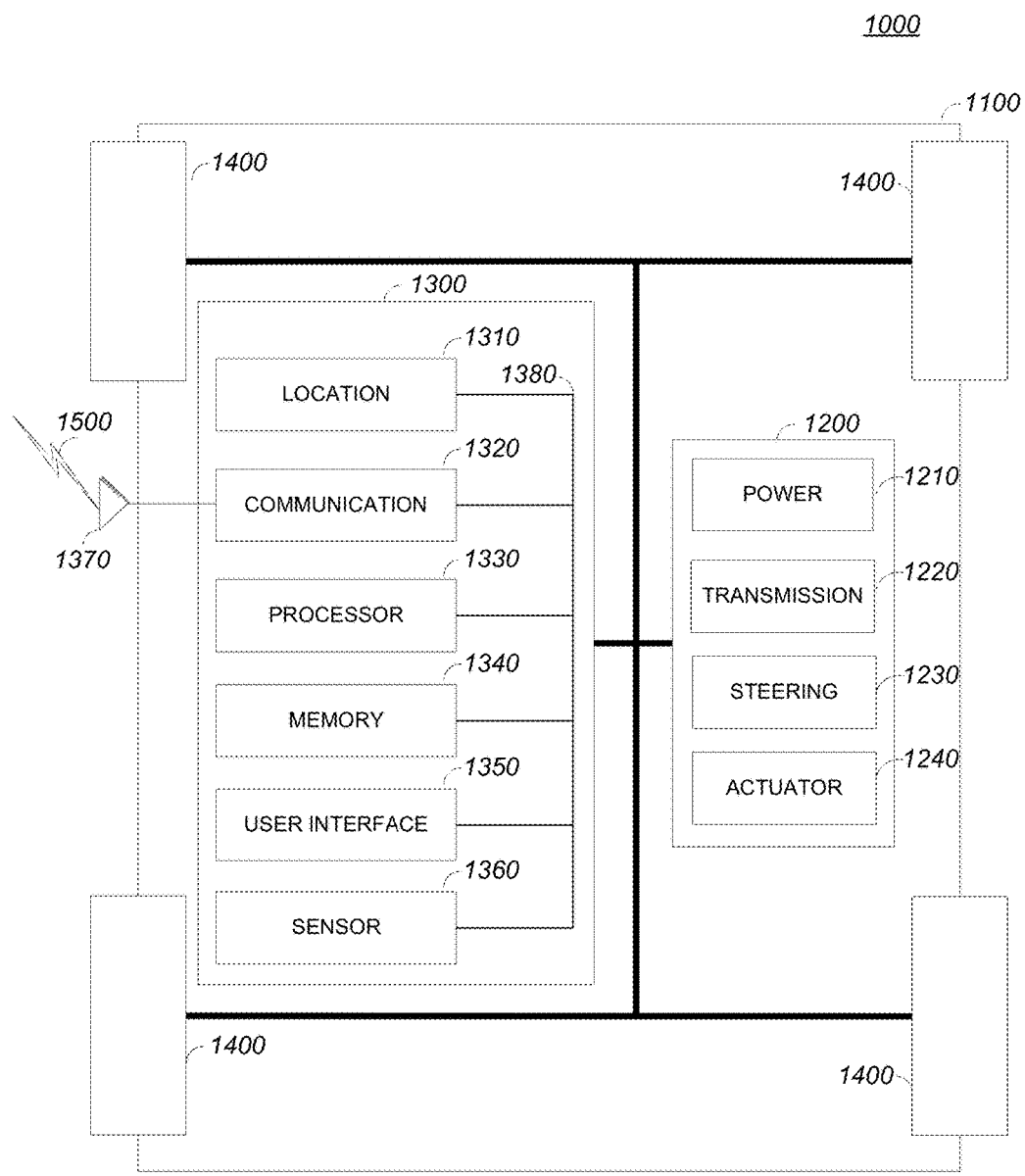
FIG. 1 is a diagram of an example of a vehicle in which the teachings herein may be incorporated.

A vehicle warning system may output an alert at or before arriving at an intersection when an oncoming car is detected but the possibility of collision is not imminent. Such an alert can be a nuisance to the operator, driver or user of the vehicle. This is referred to as a "nuisance alarm." Nuisance alarms reduce the efficacy of a vehicle warning system because users may not pay attention to alerts if the system produces a significant number of nuisance alarms.

One situation in which nuisance alarms arise is when a host vehicle ("HV") is driving slowly toward an intersection. If a remote vehicle ("RV") will pass through the intersection before the HV will enter the intersection, the driver is able to enter the intersection. If the alert is presented to the driver of the host vehicle when the possibility of collision is not imminent, the driver of the host vehicle may not pay attention to the alarm. Similarly, if the alert is presented to the driver of the HV when the HV is not within a certain range of the intersection, the driver of the HV vehicle may not pay attention to the alarm. For example, an alert presented to the host driver too soon, such as outside of a certain time or distance range of the HV entering the intersection. In this situation, the driver might consider the alert as to potentially conflicting vehicles a nuisance alarm.

In another situation in which nuisance alarms arise is when the HV is driving quickly toward an intersection. If the RV will pass through the intersection after the HV will enter the intersection, the driver is able to enter the intersection. If an alert is presented to the driver of the HV too late, for example, after the HV has passed through the intersection or while the driver is passing through the intersection, the operator of the HV may not pay attention to the alarm. In this situation, the operator might consider an alert as to potentially conflicting vehicles a nuisance alarm.

On the other hand, when an alert is presented to the operator of the HV when the HV is within a certain distance from the intersection and the HV may not pass through the intersection before the RV will enter the intersection, the alert as to potentially conflicting vehicles should be considered relevant by driver of the HV.

The systems and methods described herein utilize information describing the geospatial state and kinematic state of the host vehicle and other vehicles to determine whether the HV and a RV have a converging time to a converging location. If the HV and the remRV do not have a converging time to a converging location, an alert that would otherwise be output by the warning system can be suppressed. If the HV and the RV do have a converging time to a converging location, the operation system determines a warning threshold at which a fixed deceleration of the HV to the converging location is achieved using a reaction delay of an operator of the HV and a system signal propagation delay. If the converging time is less than the warning threshold, then the operation system modifies operation of the HV. For example, the operation system may apply braking to the vehicle.

FIG. 1 is a diagram of an example of a vehicle in which the aspects, features, and elements disclosed herein may be implemented. In some embodiments, a vehicle 1000 includes a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which can include accelerating, decelerating, steering, or otherwise controlling the vehicle 1000.

The powertrain 1200 includes a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400 to provide a motive force. The transmission 1220 may be controlled by the controller 1300, the actuator 1240 or both. The steering unit 1230 may be controlled by the controller 1300, the actuator 1240, or both and controls the wheels 1400 to steer the vehicle. The actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor is operatively coupled with the memory 1340 via a communication bus 1380.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via a wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single electronic communication unit 1320 and a single electronic communication interface 1370, any number of communication units and any number of communication interfaces may be used. In some embodiments, the electronic communication unit 1320 can include a dedicated short range communications (DSRC) unit, a wireless safety unit (WSU), or a combination thereof.

The location unit 1310 may determine geolocation information, such as longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensors 1360 can provide information regarding current operating characteristics of the vehicle. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensors 1360 may include sensors that are operable to obtain information regarding the physical environment surrounding the vehicle 1000. For example, one or more sensors detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, in some embodiments, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
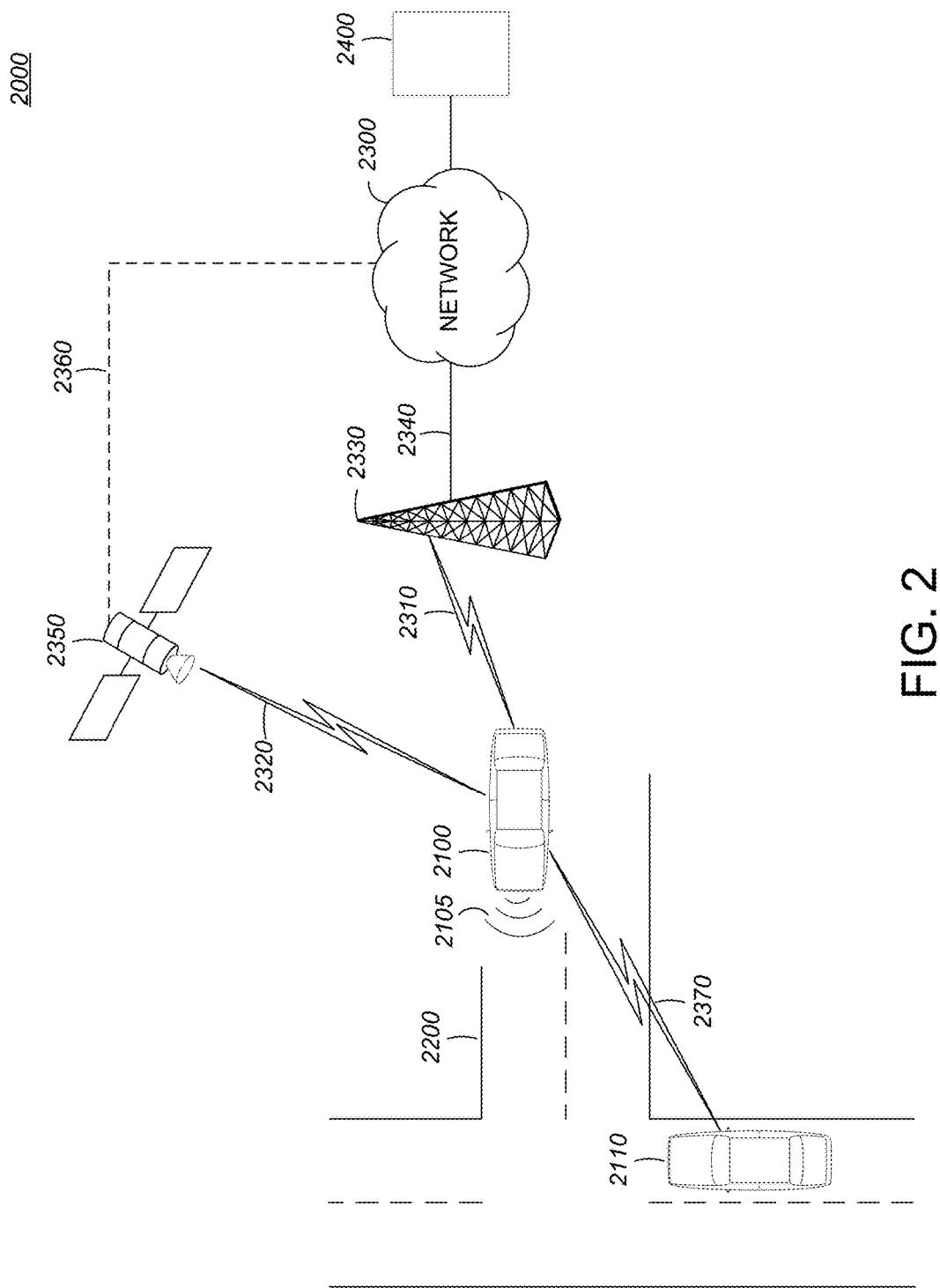
FIG. 2 is a diagram of an example of a portion of a vehicle transportation and communication system.

FIG. 2 is a diagram of an example of a portion of a vehicle transportation and communication system in which the aspects, features, and elements disclosed herein may be implemented. The vehicle transportation and communication system 2000 includes one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

The electronic communication network 2300 may be a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the electronic communication network 2300.

In some embodiments, a vehicle 2100/2110 communicates via a wired communication link (not shown), a wireless communication link 2310/2320/2370, or a combination of any number of wired or wireless communication links. For example, as shown, a vehicle 2100/2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle 2100 may receive one or more automated inter-vehicle messages, such as a basic safety message (BSM), from a remote, or target, vehicle 2110, via a direct wireless communication link 2370, or via an electronic communication network 2300. For example, the remote vehicle 2110 may broadcast the message to host vehicles within a defined broadcast range, such as 300 meters. In some embodiments, the host vehicle 2100 receives a message via a third party, such as a signal repeater (not shown) or another remote vehicle (not shown). In some embodiments, a vehicle 2100/2110 transmits one or more automated inter-vehicle messages periodically based on a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with a vehicle 2100, with the electronic communication network 2300, with one or more communication devices 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. A satellite 2350, which may include a computing device, may be configured to communicate with a vehicle 2100, with the electronic communication network 2300, with one or more communication devices 2400, or with a combination thereof via one or more communication links 2320/2360. Although shown as a single unit, a satellite can include any number of interconnected elements.

An electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, a vehicle 2100 identifies a portion or condition of the vehicle transportation network 2200. For example, the vehicle may include one or more on-vehicle sensors 2105, such as sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, a vehicle 2100 traverses a portion or portions of one or more vehicle transportation networks 2200 using information communicated via the electronic communication network 2300, such as information representing the vehicle transportation network 2200, information identified by one or more on-vehicle sensors 2105, or a combination thereof.

For simplicity, FIG. 2 shows one vehicle 2100, one vehicle transportation network 2200, one electronic communication network 2300, and one communication device 2400. However, any number of vehicles, networks, or computing devices may be used. In some embodiments, the vehicle transportation and communication system 2000 includes devices, units, or elements not shown in FIG. 2. Although the vehicle 2100 is shown as a single unit, a vehicle can include any number of interconnected elements.

Although the vehicle 2100 is shown communicating with the communication device 2400 via the electronic communication network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
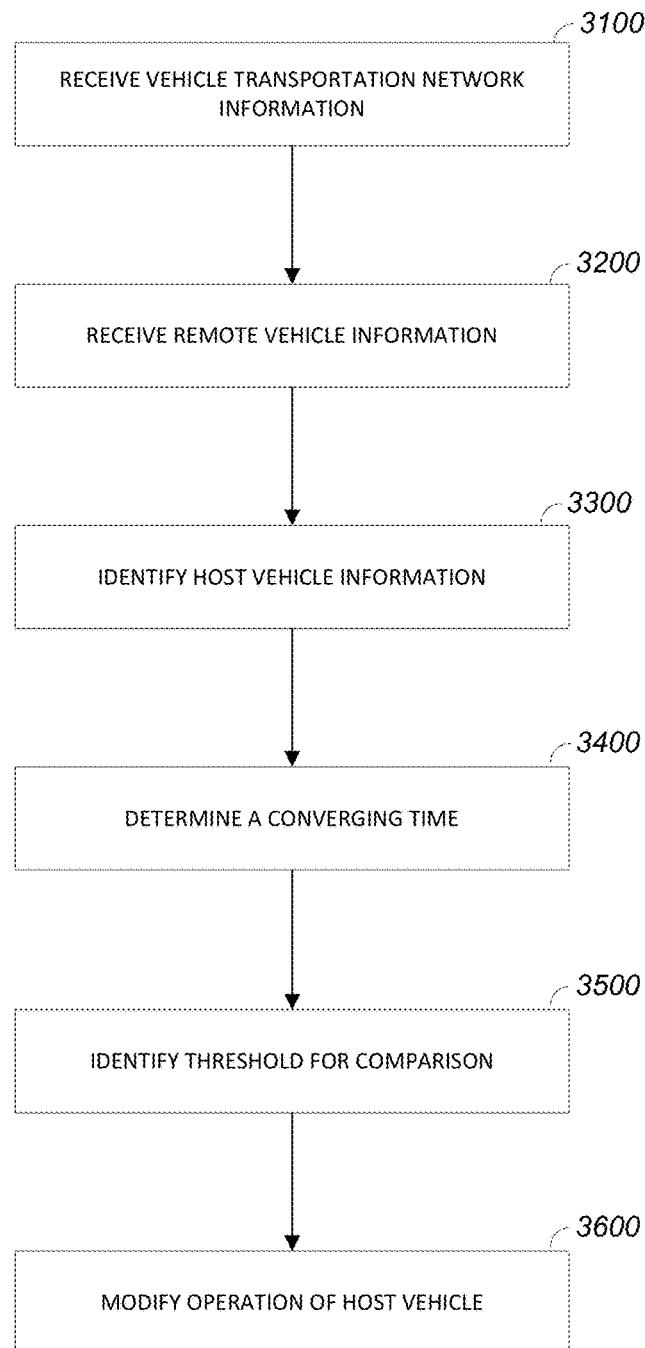
FIG. 3 is a flowchart diagram of a method for operating a vehicle according to the teachings herein.

FIG. 3 is a flowchart diagram of a method 3000 of operating a host vehicle in accordance with the teachings in this disclosure. In some embodiments, the method 3000 may be implemented in a vehicle, such as the vehicle 1000 shown in FIG. 1 or the vehicles 2100/2110 shown in FIG. 2. In other embodiments, the method may be implemented in whole or in part external of vehicles, such as within one or more processors of communication device 2400, with transmission of relevant information, such as remote vehicle information, to one or more vehicles.

In the embodiment of FIG. 3, the method of operating the host vehicle includes receiving vehicle transportation network information at 3100, receiving remote vehicle information at 3200, identifying host vehicle information at 3300, determining a converging time at 3400, identifying a warning threshold at 3500, and modifying operation of the host vehicle at 3600.

The vehicle transportation network information may be received at 3100 from a storage device local to the host vehicle or may be transmitted from a source outside of the host vehicle. Vehicle transportation network information at 3100 may represent one or more unnavigable areas, such as buildings, one or more partially navigable areas, such as a parking area, one or more navigable areas, such as roads, or a combination thereof. The vehicle transportation network information may also include one or more interchanges between one or more navigable, or partially navigable, areas. A road may include one or more lanes, and may be associated with one or more directions of travel. Lanes can be marked or unmarked.

Vehicle transportation network information may be expressed as a hierarchy of elements, such as markup language elements, which may be stored in a database or file. For simplicity, this disclosure depicts vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, or a combination thereof.

Figure 4:
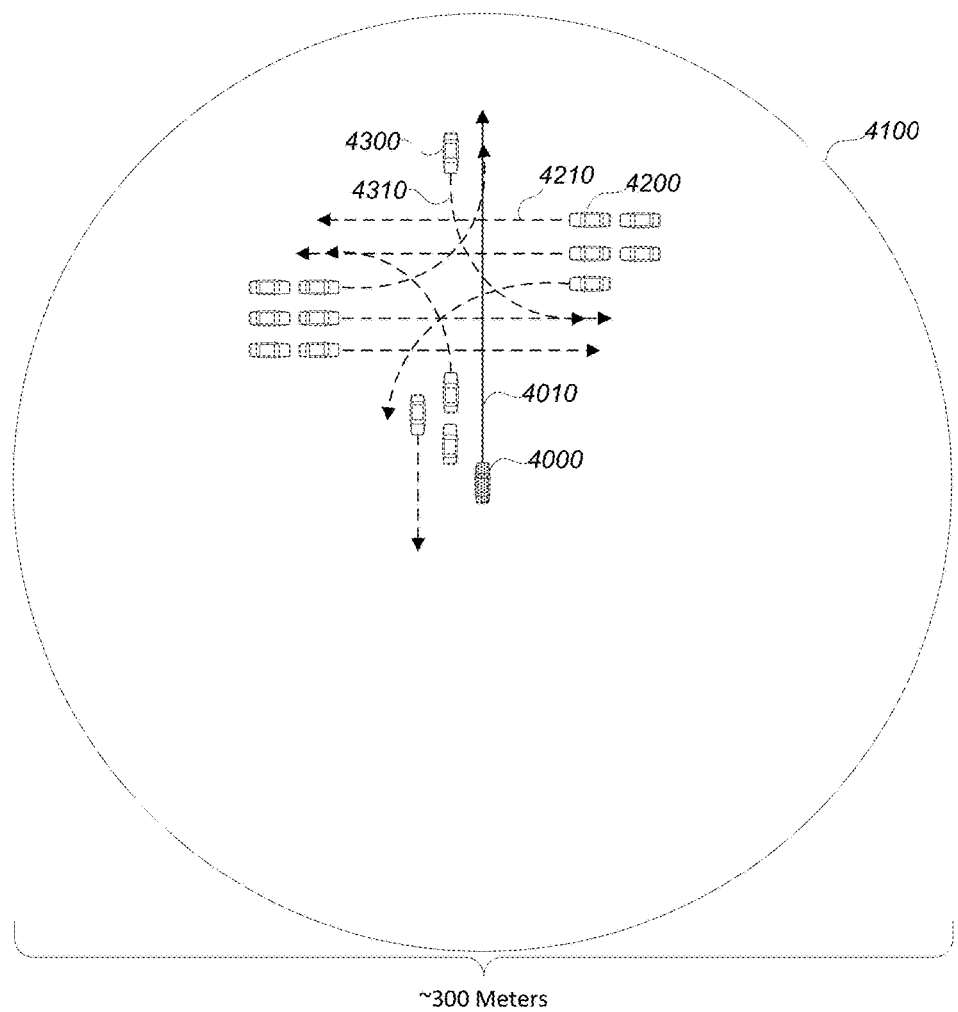
FIG. 4 is a diagram of determining expected paths of a remote vehicle and a host vehicle.
Figure 5:
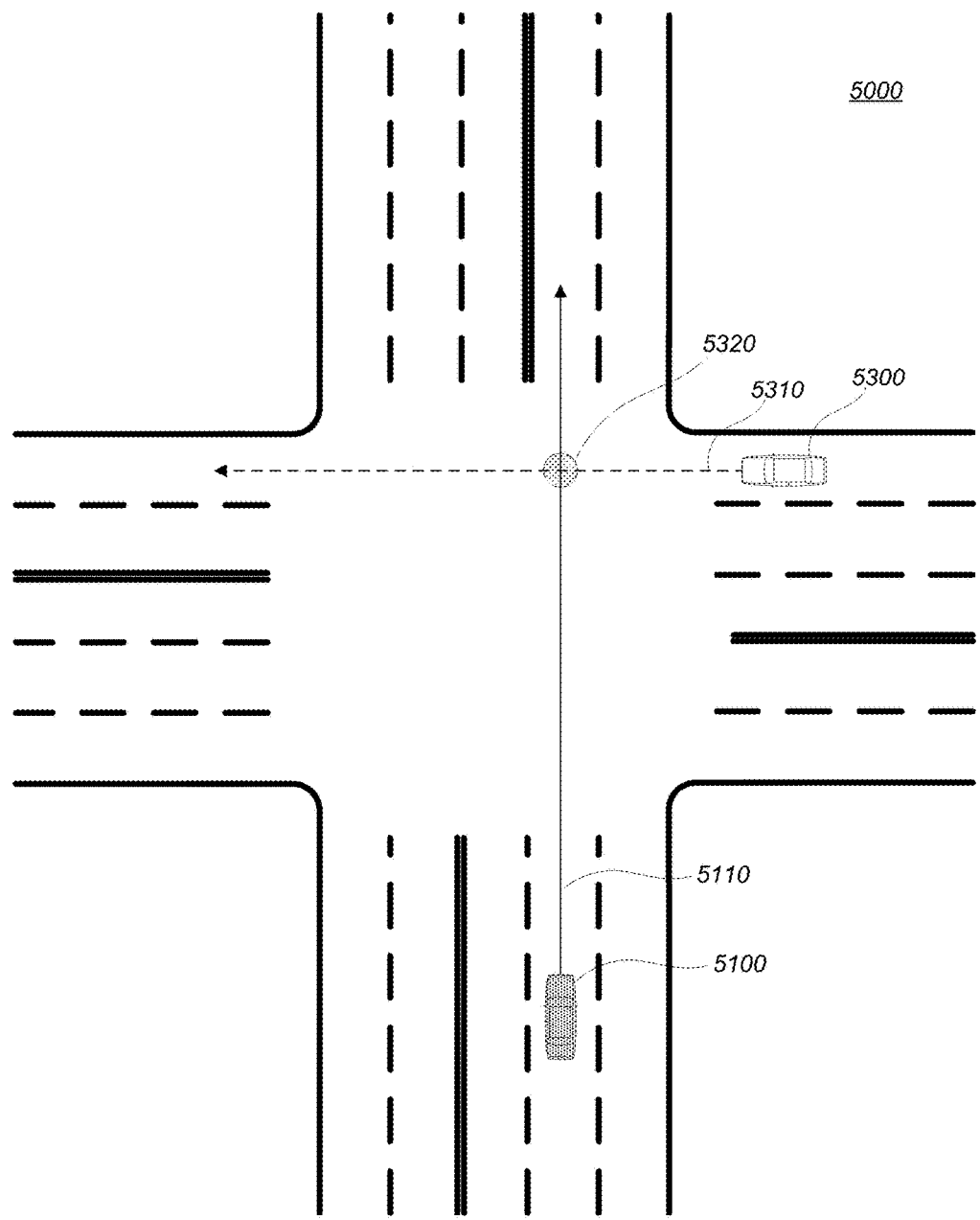
FIG. 5 is a diagram identifying converging paths of a host vehicle and a remote vehicle.

Examples of vehicle transportation network information may be seen in FIGS. 4 and 5 by example. The vehicle transportation network information generally includes lanes in which the host vehicle and one or more remote vehicles are traveling, as well as successor and predecessor lanes to the current lane and any adjacent lanes (also referred to as sibling lanes) that are within a defined geospatial range. The defined geospatial range may be a fixed value or may be variable based on the traveling speed of the host vehicle.

In some implementations, the host vehicle receives the remote vehicle information at 3200 from a remote vehicle message sent by a remote vehicle, such as from the remote vehicle 5300 shown in FIG. 5, via a communication link, such as the wireless electronic communication link 2370 shown in FIG. 2. The information may be received in whole or in part through dedicated short-range communications (DSRC) in vehicle-to-vehicle (V2V) and vehicle-to-infrastructure (V2I) short-range wireless communications, for example. In some embodiments, the host vehicle may store the remote vehicle information. For example, the host vehicle stores the remote vehicle information in a memory of the host vehicle, such as the memory 1340 shown in FIG. 1. The remote vehicle information received over time may be stored with timestamps.

Although one technique involves receiving remote vehicle information from a remote vehicle message sent by a remote vehicle, the particular technique of receiving the remote vehicle information is not so limited. That is, the remote vehicle information indicates a geospatial state and a kinematic state for the remote vehicle. In some embodiments, for example, the geospatial state includes geospatial coordinates for the remote vehicle, such as longitude and latitude coordinates that may be converted to map coordinates. The kinematic state may include a remote vehicle velocity for the remote vehicle, a remote vehicle heading for the remote vehicle, a remote vehicle acceleration for the remote vehicle, or a remote vehicle yaw rate for the remote vehicle, or any other information, or combination of information, relevant to the operational state of the remote vehicle. As a result, receiving the remote vehicle information may be achieved by a variety of techniques that either provide the remote vehicle information directly or provide information from which the remote vehicle information may be determined.

For example, remote vehicle information may be received from a location of an infrastructure device in the vehicle transportation network. Such infrastructure devices may include smart devices such as a traffic light, a road sensor, a road camera, or any other non-vehicle device associated with the vehicle transportation network and capable of detecting a vehicle. Remote vehicle information may also be received from a portable device while it is associated with a vehicle. For example, a portable device, such as a smartphone, carried by a passenger of the vehicle includes geographic location information, such as GPS or assisted GPS (AGPS) information and may include information associating the passenger with the vehicle.

The collection of remote vehicle information is not limited to any particular technique provided that the technique can associate the information with the particular remote vehicle. For example, SONAR, RADAR, and/or LIDAR mounted on the host vehicle, remote vehicle(s) or infrastructure device(s) may provide input that can be used to calculate or otherwise generate the remote vehicle information.

The host vehicle information identified at 3300 may include a geospatial state and a kinematic state for the host vehicle. Like the remote vehicle information, the geospatial state for the host vehicle may include geospatial coordinates, such as longitude and latitude coordinates. In some embodiments, the kinematic state may include a host vehicle velocity for the host vehicle, a host vehicle heading for the host vehicle, a host vehicle acceleration for the host vehicle, or a host vehicle yaw rate for the host vehicle, or any other information, or combination of information, relevant to the operational state of the host vehicle. When the method 300 is performed at the host vehicle, the host vehicle may use its on-board sensor information, such as from sensors 1360 and/or location unit 1310 of FIG. 1, to identify the host vehicle information. Alternatively or additionally, host vehicle information may be received from other devices such as those discussed with respect to the remote vehicle information.

A converging time to a converging location is determined at 3400 based on the remote vehicle information and the host vehicle information. This may include determining expected paths of the remote vehicle and the host vehicle, determining the converging location based on the expected paths, and calculating the converging time based on the determined converging location. This is explained with reference to FIGS. 4 and 5.

FIG. 4 is a diagram of determining expected paths of a remote vehicle and a host vehicle. In this example, the expected paths or trajectories are determined based on automated inter-vehicle messages. However, this is not necessary—any source of the remote vehicle spatial and kinetic information and the host vehicle spatial and kinetic information may be used to determine the expected paths or trajectories. Determining the expected paths of the remote vehicle and the host vehicle may be may be implemented in a vehicle, such as the vehicle 1000 shown in FIG. 1 or the vehicles 2100/2110 shown in FIG. 2, or may be implemented remotely with the results transmitted to one or more of the vehicles such as the host vehicle 400. In some embodiments, one or more of the vehicles shown in FIG. 4, including the remote vehicles, the host vehicle, or both, may be stationary or may be in motion. The host vehicle is shown with stippling, and remote vehicles are shown in white. For simplicity and clarity, the diagrams shown in FIG. 4, and in FIG. 5 discussed below, are oriented with north at the top and east at the right side. In FIG. 4 a defined geospatial range 4100 is shown as approximately 300 meters; however, other ranges may be used.

In some embodiments, a host vehicle 4000 traverses a portion of a vehicle transportation network (not expressly shown), receives automated inter-vehicle communications from one or more remote vehicles 4200/4300 within the defined geospatial range 4100, and transmits automated inter-vehicle communications to one or more remote vehicles 4200/4300 within the defined geospatial range 4100. An automated inter-vehicle communication received by a host vehicle from a remote vehicle may be referred to herein as a remote vehicle message. For example, the host vehicle 4000 receives the remote vehicle messages via a wireless electronic communication link, such as the direct wireless communication link 2370 shown in FIG. 2.

The automated inter-vehicle messages may indicate information such as geospatial location information and heading information. In some embodiments, the host vehicle 4000 transmits one or more automated inter-vehicle messages including host vehicle information, such as host vehicle heading information. For example, as shown in FIG. 4, the host vehicle heading information indicates that the host vehicle 4000 is heading straight ahead. In some embodiments, a remote vehicle 3100 transmits one or more automated inter-vehicle messages including remote vehicle information, such as remote vehicle heading information. For example, the remote vehicle heading information indicates that the remote vehicle 4200 is heading straight west in FIG. 3. In another example, a remote vehicle 4300 transmits one or more automated inter-vehicle messages including remote vehicle information that includes remote vehicle heading information, which indicates that the remote vehicle 4300 is heading south.

The host vehicle 4000 identifies a host vehicle expected path 4010 for the host vehicle based on host vehicle information, such as a geospatial state and a kinematic state. The host vehicle 4000 may also identify a remote vehicle expected path for a remote vehicle based on the automated inter-vehicle messages, which include remote vehicle information such as a geospatial state and a kinematic state for the remote vehicle. For example, the remote vehicle messages transmitted by the remote vehicle 4200 in FIG. 3 indicate that the remote vehicle 4200 is heading west, and the host vehicle 4000 may identify the remote vehicle expected path 4210 for the remote vehicle 4200. In another example, the remote vehicle messages transmitted by the remote vehicle 4200 in FIG. 4 indicate that the remote vehicle 4300 is heading south, and may include navigation information, such as turn signal information indicating a left turn. Using this information, the host vehicle 4000 may identify the remote vehicle expected path 4310 for the remote vehicle 4300 using any one of a number of techniques.

The heading and expected path of the host vehicle 4000 are shown as a solid directional line and the expected paths of respective remote vehicles are shown as directional broken lines. Expected paths are omitted from FIG. 4 for some vehicles for simplicity and clarity. How an expected path is determined is not particularly critical here. In one implementation, the heading and speed of a vehicle are used to project the position of the vehicle at certain points in the future, i.e., the expected path, such as at one second intervals.

FIG. 5 is a diagram of identifying or determining a converging location. The converging location is determined based on the expected paths. From the converging location, a converging time may be calculated, which is the time at which the host vehicle will reach the converging location. Identifying a converging path may be implemented in a vehicle, such as the vehicle 1000 shown in FIG. 1 or the vehicles 2100/2110 shown in FIG. 2, or may be implemented remotely with the results transmitted to one or more vehicles such as the host vehicle 5100. As shown, host vehicle 5100 traverses a portion of a vehicle transportation network represented by the vehicle transportation network information described previously. In this case, the host vehicle 5100 is travelling northbound in the center travel lane at an intersection 5000. The host vehicle 5100 may receive remote vehicle messages from a remote vehicle 5300 within a defined reception range. The remote vehicle messages may include the geospatial state and kinematic state of the remote vehicle 5300. The remote vehicle 5300 is travelling westbound in the rightmost travel lane at the intersection 5000.

The host vehicle 5100 may identify a host vehicle expected path 5110 for the host vehicle 5100, and may identify a remote vehicle expected path 5310 for the remote vehicle 5300 as described with respect to FIG. 4. In some embodiments, the host vehicle 5100 determines that the remote vehicle expected path 5310 is convergent with the host vehicle expected path 5110—that is, at current conditions, the vehicles would reach a converging location 5320. The host vehicle 5100 can then determine a converging time to the converging location 5320 based on the remote vehicle information and the host vehicle information. For example, the host vehicle 5100 determines the converging time based on the distance to be traveled by the host vehicle to the current converging location 5320 using the speed of the host vehicle under the current conditions of the host vehicle, such as the speed and location of the host vehicle relative to the converging location 5320.

Returning again to FIG. 3, a threshold is identified at 3500. The threshold is a value at which a fixed deceleration of the host vehicle to the converging location is achieved using a reaction delay of an operator of the host vehicle. The threshold is a step function based on the kinematic state of the host vehicle and is used for comparison with the converging time. The kinematic state of the host vehicle may be the speed of the host vehicle. While one threshold may be calculated or identified, benefits can also be achieved with several thresholds. Identification of the one or more thresholds is described in further detail with reference to FIGS. 6A-14.

Once the threshold is identified for comparison at 3500, it may be used to determine whether, and optionally how, to modify operation of the host vehicle at 3600. That is, for example, modifying operation of the host vehicle is responsive to the converging time reaching the threshold. For example, the threshold may be an informative threshold. If the converging time reaches the informative threshold, the operation of the host vehicle may be modified, at least initially, by issuing an informative advisory to the operator of the host vehicle using an audio output device, a visual output device, or both. The threshold may also be a warning threshold. If the converging time reaches the warning threshold, the operation of the host vehicle may be modified, at least initially, by issuing a warning to the operator of the host vehicle using an audio output device, a visual output device, or both. If both the informative threshold and the warning threshold are identified, the content and/or means of delivery of the informative advisory and the warning to the operator may be different. For example, the informative threshold may be a higher value than the warning. Hence, the content and/or means of delivery of the informative advisory when the converging time reaches the first threshold, i.e., the informative advisory, may be less intrusive that when the converging time reaches the second threshold, i.e., the warning threshold.

Operation of the host vehicle may be modified at 3600 by other actions responsive to the converging time reaching the threshold. These actions may be performed automatically by signals from the processor of the host vehicle to one or more powertrain components, such as the processor 1330 of FIG. 1, either alone or in combination with actions by the operator. In an example, for an operator of a vehicle to bring the vehicle to a stop before reaching the converging location, such as the intersection of two crossing vehicle paths shown in FIG. 5, the operator may apply a brake force to the host vehicle to modify its operation. An automatic braking system may also apply a brake force to the host vehicle. In some cases, modifying the steering angle of the host vehicle (e.g., through signals to the steering unit 1230 of FIG. 1) so as to move or eliminate the converging location with the remote vehicle may also occur. In other words, the threshold may be or include a control threshold that triggers operational changes to the host vehicle in addition to or instead of one or more warnings.

The method 3000 of FIG. 3 may be performed periodically. The method 3000 may also be performed based on a command by the operator, or based on a change in the host vehicle information or the remote vehicle information that is above one or more thresholds that would result in changes in the converging location, the converging time and/or the threshold. In this way, for example, the converging time decreases as the host vehicle continues to advance to the converging location. In another example, the converging location changes resulting in a change to the converging time from a previous value.

As mentioned above, the identified threshold is a step function based on the kinematic state of the host vehicle, and it is determined so as to achieve a fixed deceleration of the host vehicle to the converging location. The kinematic state of the host vehicle can include the host vehicle speed such that a threshold produced by the step function is a fixed value for vehicle speeds below a first speed threshold and increases above the fixed value in a step-wise manner for speeds above the first speed threshold. For example, a constant value for the threshold of four seconds may be adequate for specific speed ranges, such as for vehicle speeds of 0 to 40 miles per hour. At higher speeds, however, the acceleration value would increase (i.e., no longer be fixed) unless the threshold were increased so as to, e.g., provide an earlier warning, such that there is more time for the operator and/or the controller of the vehicle to react and take timely action. This disclosure implements a graduated threshold time for warnings and other actions responsive to the determination of a converging point.

The host vehicle information includes a number of variables affecting the deceleration of the host vehicle that may be taken into account in identifying the threshold. As already mentioned, one variable may be the reaction delay of the operator. The reaction delay of the operator is an amount of time before an operator of the host vehicle is expected to take action once the operator recognizes that a remote vehicle is on a converging path with the host vehicle. This may be a predetermined value based on, e.g., experimental data, or may be a learned value that is based on detected reaction delays of the operator of the host vehicle over time.

Another variable that may affect the deceleration of the host vehicle and hence be used identify the threshold is a minimum time at which a warning (or other operating instruction) is issued. In some embodiments, the minimum time is a predetermined value. In other embodiments, the minimum time is a learned value based on the operation of the host vehicle over time. For example, if the operator frequently or consistently takes action later than the warning, the minimum time may be reduced over time.

The fixed deceleration, also called a brake level herein, is described as fixed as it is a fixed value over the range of values for the kinetic state of the host vehicle (e.g., the host vehicle speed), and desirably but not necessarily remains fixed for the calculation of any number of thresholds. However, the deceleration may be a learned value and hence change over time (e.g., between subsequent identifications of the threshold(s)). In one implementation, the fixed deceleration is a learned value based on the host vehicle information gathered during operation by the operator of the host vehicle over time. For example, if the operator modifies operation of the host vehicle responsive to the converging time reaching the threshold such that the actual acceleration is generally higher or generally lower than the fixed deceleration used to identify the threshold, the fixed deceleration may be raised or lowered accordingly.

A system propagation delay may also be considered in determining the threshold. The system propagation delay can include, for example, the amount of time for a signal responsive to the converging time reaching the threshold will take to modify operation of the host vehicle. The system propagation delay may be fixed depending upon the type of operation. For example, the system signal propagation delay would be one value when the operation is transmission of a warning signal but would be a higher value when the operation includes activating a component or element of the transmission system of the host vehicle.

In some embodiments, a graduated threshold for issuing a warning or otherwise modifying operation of the host vehicle may be expressed by:

$$TTC_{Warn}^{HV} = \frac{TTC_{Warn_{min}}^{HV}}{2} \times \left[ \frac{TTC_{Warn_{min}}^{HV} - \lfloor \frac{V_0}{a_b} \rfloor - \sigma}{|TTC_{Warn_{min}}^{HV} - \lfloor \frac{V_0}{a_b} \rfloor| + \sigma} + 1 \right] +$$

$$\frac{\lfloor \frac{V_0}{a_b} \rfloor}{2} \times \left[ \frac{\lfloor \frac{V_0}{a_b} \rfloor - TTC_{Warn_{min}}^{HV} + \sigma}{|\lfloor \frac{V_0}{a_b} \rfloor - TTC_{Warn_{min}}^{HV}| + \sigma} + 1 \right] + t_{rd} + \rho$$

$TTC_{Warn}^{HV}$ is the threshold. $TTC_{Warn_{min}}^{HV}$ is the minimum time at which a warning or other operating instruction is issued, $V_0$ is the host vehicle speed at the time a warning or other operating instruction is issued, $a_b$ is the fixed deceleration or brake level of the host vehicle, $t_{rd}$ is the reaction delay of the operator of the host vehicle, $\rho$ is the system signal propagation delay, and $\sigma$ is a very small value ($0 < \sigma \ll 1$) that is used to prevent division by zero.

As can be discerned, this expression is based on a minimum time at which a warning is issued $TTC_{Warn_{min}}^{HV}$ plus vehicle speed $V_0$ at the time a warning is issued and the deceleration $a_b$ to bring the vehicle to a stop before reaching a location. For example, the location is the intersection of two crossing vehicle paths, such as converging location 5320 shown in FIG. 5. Additionally, the expression incorporates the driver's reaction time $t_{rd}$ and accounts for system signal propagation delay $\rho$. The expression above is not required to be used as long as the step function used identifies or produces an output (i.e., the threshold) that is equivalent to that produced by the expression. For example, the step function could be represented by one or more look-up tables. The subscript "Warn" is used here as the threshold is a warning threshold TCCwarn described in FIGS. 6A-14 below. The superscript "HV" indicates host vehicle. The expression is equally valid if these identifiers are omitted as the expression may be used to identify thresholds for other than warnings.

This expression may be used to identify more than one threshold. For example, a second threshold may be identified at which the fixed deceleration of the host vehicle to the converging location is achieved using the reaction delay of the operator of the host vehicle, where the second threshold is a function of the first threshold. This can increase or decrease the threshold, thus providing multiple signals to modify operation of the host vehicle as the host vehicle advances toward the converging location. One or more graduated thresholds may be generated based on the expression multiplied by different multiplicative factors r. For example, an expression may be:

$$TTC_{Inform}^{HV} = (TTC_{Warn}^{HV} - \rho) \times \tau_{Inform} + \rho$$

$TTC_{Inform}^{HV}$ is the second threshold that is a function of the first threshold. The subscript "Inform" is used in this example here as the threshold is a warning threshold TCCinform described in FIGS. 6A-14 below. The superscript "HV" again indicates host vehicle. In this example, the multiplicative factor $\tau_{inform}$ may be a value conforming to $1 \leq \tau_{inform} \leq 2$ so that the second threshold is equal to or higher than the first threshold produced by the expression above. This can provide an earlier modification to host vehicle operation. The multiplicative factor $\tau$ may also be a value such as $0 < \tau_{inform} \leq 1$ so that the second threshold (or a third threshold) is equal to or lower than the first threshold. The system signal propagation delay $\rho$ for the first threshold is the same as that for the second threshold in this example because both operations if the converging time reaches a threshold involve signaling warnings. In some cases, e.g., when other operations are involved, the system signal propagation delay added back into the threshold calculation may be different from that subtracted.

Like the first expression, this expression to modify the first threshold is not required to be used as long as the step function used identifies or produces an output (e.g., the second and/or third threshold) that is equivalent to that produced by the expression. For example, the step function could be represented by one or more look-up tables.

FIGS. 6A-13B show examples of graphs representing thresholds in host vehicles in which at first threshold is referred to as a warning threshold and a second threshold is referred to as an informative threshold. The method as described in this disclosure provides the means to define a minimum time followed by a graduated scale. Desirably, but not necessarily, each threshold is derived from a single equation rather than by a series of equations or look-up tables. Thus, the method may reduce the amount of storage needed and may eliminate complicated decision-making logic flow.

Variables used in the equations to generate the thresholds shown the graphs include one of two values for the fixed deceleration (i.e., the amount of braking force to decrease the kinematic state of the host vehicle), one of two values of the minimum time at which a warning is issued, and one of two values for the multiplicative factor. The first, fixed deceleration is equal to 0.4 g, the second, fixed deceleration is equal to 0.2 g, the first minimum time at which a warning is issued is 4 s, a second minimum time at which a warning is issued is 6 s, a first multiplicative factor is equal to 1.5, and a second multiplicative factor is equal to 2.0. The reaction delay $t_{rd}$, system signal propagation delay $\rho$, and the value $\sigma$ are the same in all graphs. The first and second thresholds generated herein may also be referred to, respectively, as a warning threshold TTCwarn and an informative threshold TTCinform by example.

Each graph is evaluated at two example host vehicle speeds of approximately 20 miles per hour (mph) and 60 mph to determine an approximate minimum amount of time, in seconds(s), in which an alert, such as an informative alert/advisory or a warning, is generated. That is, the threshold at each of 20 mph and 60 mph is discussed for each graph.

Figure 6A:
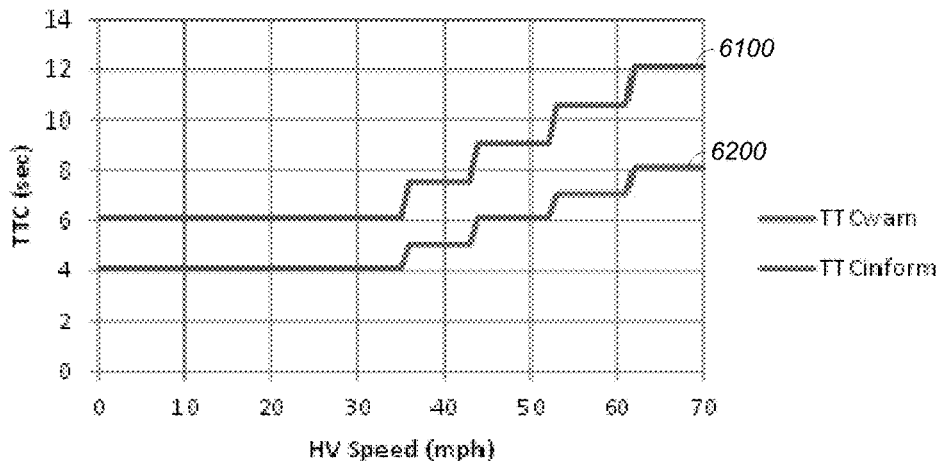
FIGS. 6A and 6B are graphs of a first threshold and a second threshold identified using a first, fixed deceleration and a first multiplicative factor with different minimum times at which a warning is issued.
Figure 6B:
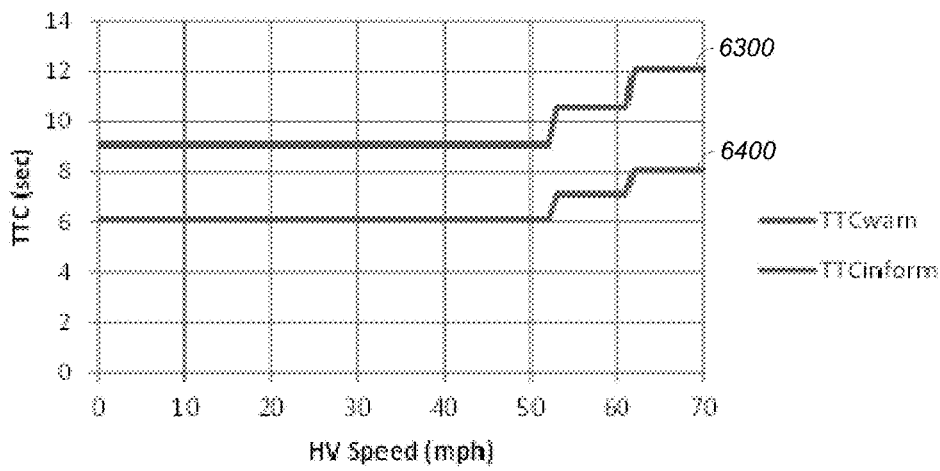

FIGS. 6A and 6B are graphs of a first threshold and a second threshold identified using a first, fixed deceleration and a first multiplicative factor with different minimum times at which a warning is issued. FIG. 6A uses the first minimum time, and FIG. 6B uses the second minimum time. Using the equations, the system generates an informative threshold line 6100/6300 and a warning threshold line 6200/6400. The informative threshold line 6100/6300 represents the threshold for generating an informative alert/advisory in the host vehicle at different speeds. The warning threshold line 6200/6400 represents the threshold for generating a warning in the host vehicle at the different speeds.

In FIG. 6A, when the host vehicle is traveling at 20 mph, the informative threshold is 6 s and the warning threshold is 4 s. When the host vehicle is traveling at 60 mph, the informative threshold is 10.5 s and the warning threshold is 7 s. In FIG. 6B, when the host vehicle is traveling at 20 mph, the informative threshold is 9 s and the warning threshold is 6 s. When the host vehicle is traveling at 60 mph, the informative threshold is 10.5 s and the warning threshold at 7 s. These graphs demonstrate that an increase in the minimum time at which a warning is issued delays increases in the threshold until the host vehicle is traveling at a faster speed. In particular, both the informative threshold line 6100 and the warning threshold line 6200 show increases in the threshold when then the host vehicle is traveling at a lower speed (e.g., at about 35 mph), whereas the informative threshold line 6300 and the warning threshold line 6400 do not begin to show increases in the threshold until the host vehicle is traveling at a higher speed (e.g., at about 53 mph).

Figure 7A:
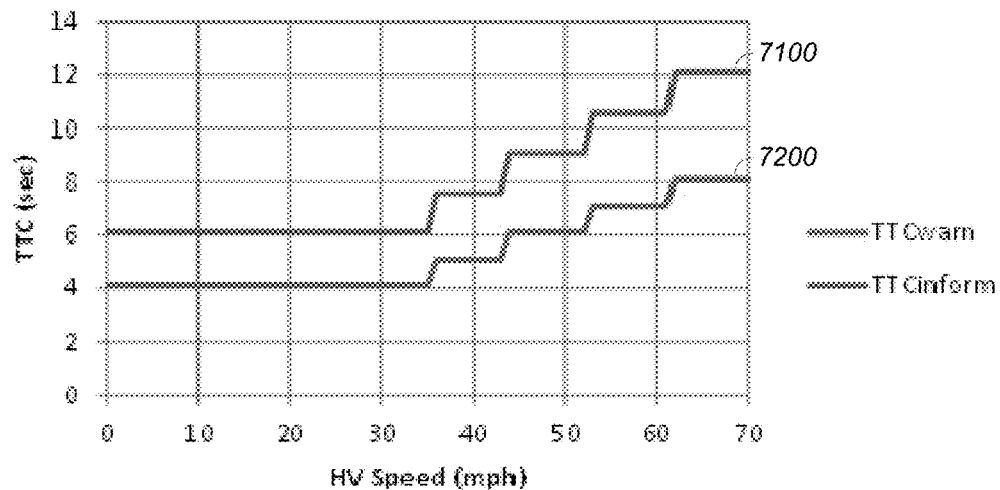
FIGS. 7A and 7B are graphs of a first threshold and a second threshold identified using the first, fixed deceleration and a first minimum time at which a warning is issued with different multiplicative factors.
Figure 7B:
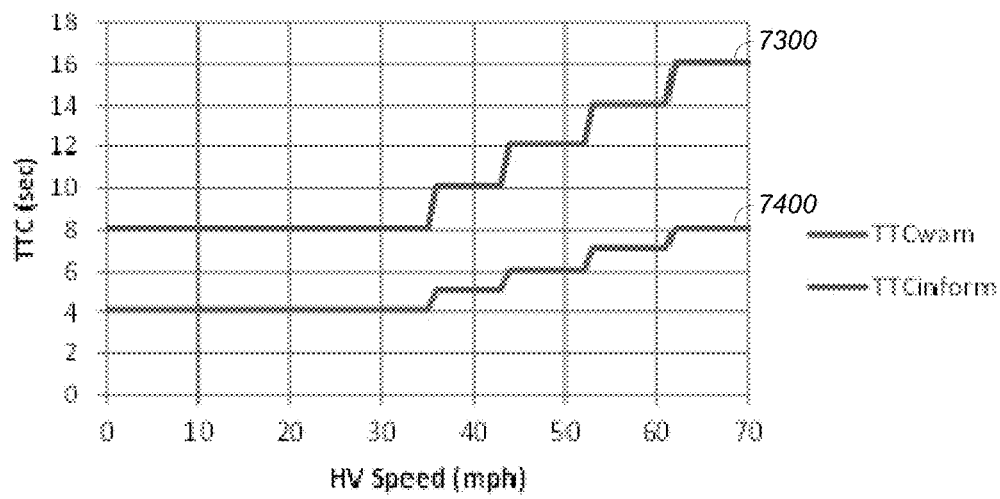

FIGS. 7A and 7B are graphs of a first threshold and a second threshold identified using the first, fixed deceleration and a first minimum time at which a warning is issued with different multiplicative factors. FIG. 7A uses the first multiplicative factor, and FIG. 7B uses the second multiplicative factor. Using the equations, the system generates an informative threshold line 7100/7300 and a warning threshold line 7200/7400. The informative threshold line 7100/7300 represents the threshold for generating an informative alert/advisory in the host vehicle at different speeds. The warning threshold line 7200/7400 represents the threshold for generating a warning in the host vehicle at the different speeds.

In FIG. 7A, when the host vehicle is traveling at 20 mph, the informative threshold is 6 s and the warning threshold is 4 s. When the host vehicle is traveling at 60 mph, the informative threshold is 10.5 s and the warning threshold is 8 s. In FIG. 7B, when the host vehicle is traveling at 20 mph, the informative threshold line is 8 s and the warning threshold is 4 s. When the host vehicle is traveling at 60 mph, the informative threshold is 14 s and the warning threshold is 7 s. The graphs indicate that the rate of increase in the informative threshold is greater with a larger multiplicative factor. In particular, both the informative threshold 7100/7300 and the warning threshold line 7200/7400 show increases in the threshold when then the host vehicle is traveling at a speed of about 35 mph. In FIG. 7A, when the host vehicle is traveling at 20 mph, the difference between the two thresholds is 2 s, while the difference at 60 mph is 4 s. In contrast, FIG. 7B shows that when a host vehicle is traveling at 20 mph, the difference between the two thresholds is 4 s, while the difference at 60 mph is 7 s. Thus, a larger multiplicative factor results in a higher second threshold, where the increase of the higher threshold as compared to first threshold is amplified when the host vehicle is traveling at higher speeds (in this example starting at about 53 mph).

Figure 8A:
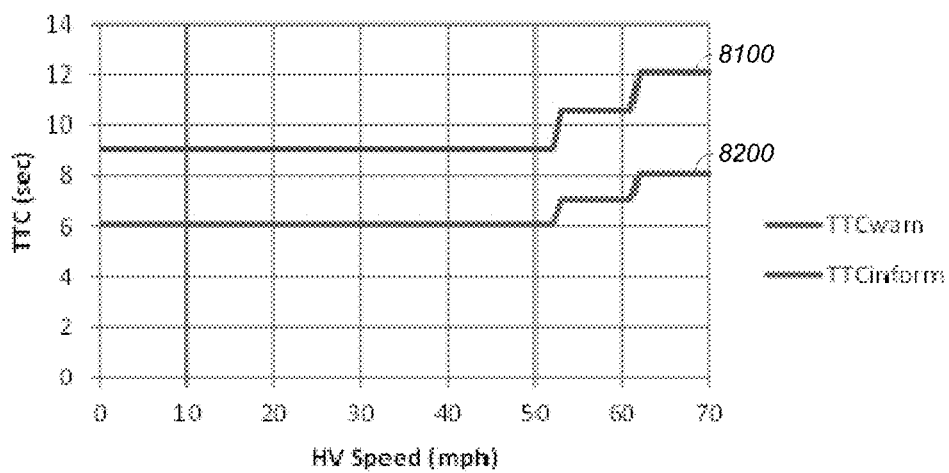
FIGS. 8A and 8B are graphs of a first threshold and a second threshold identified using the first, fixed deceleration and a second minimum time at which a warning time is issued with different multiplicative factors.
Figure 8B:
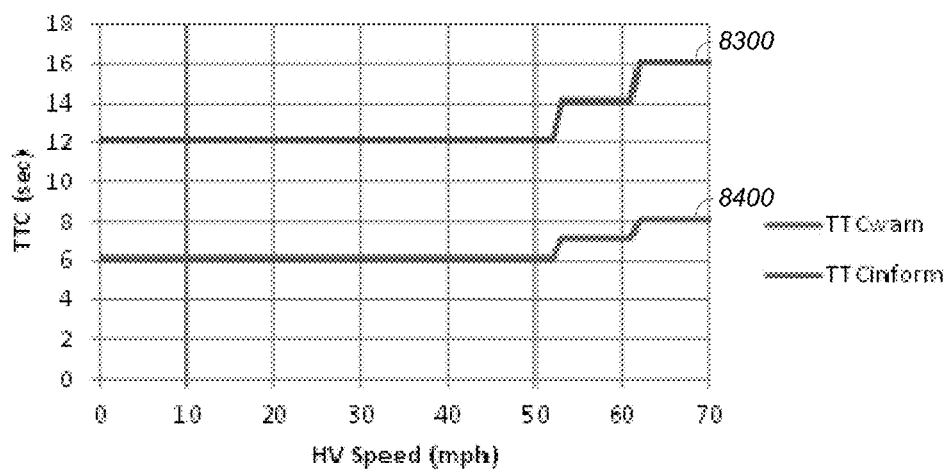

FIGS. 8A and 8B are graphs of a first threshold and a second threshold identified using the first, fixed deceleration and a second minimum time at which a warning time is issued with different multiplicative factors. FIG. 8A uses the first multiplicative factor, and FIG. 8B uses the second multiplicative factor. Using the equations, the system generates an informative threshold line 8100/8300 and a warning threshold line 8200/8400. The informative threshold line 8100/8300 represents the threshold for generating an informative alert/advisory in the host vehicle at different speeds. The warning threshold line 8200/8400 represents the threshold for generating a warning in the host vehicle at the different speeds.

In FIG. 8A, when the host vehicle is traveling at 20 mph, the informative threshold is 9 s and the warning threshold is 6 s. When the host vehicle is traveling at 60 mph, the informative threshold is 10.5 s and the warning threshold is 7 s. In FIG. 8B, when the host vehicle is traveling at 20 mph, the informative threshold is 12 s and the warning threshold is 6 s. When the host vehicle is traveling at 60 mph, the informative threshold is 14 s and the warning threshold is 7 s. The graphs show that both the informative threshold and the warning threshold do not begin increasing until the host vehicle is traveling at a relatively high speed (e.g., at about 53 mph). In addition, and as demonstrated with FIGS. 7A and 7B, the rate of increase in the informative threshold as compared to the warning threshold increases with speed when a larger multiplicative factor is used.

Figure 9A:
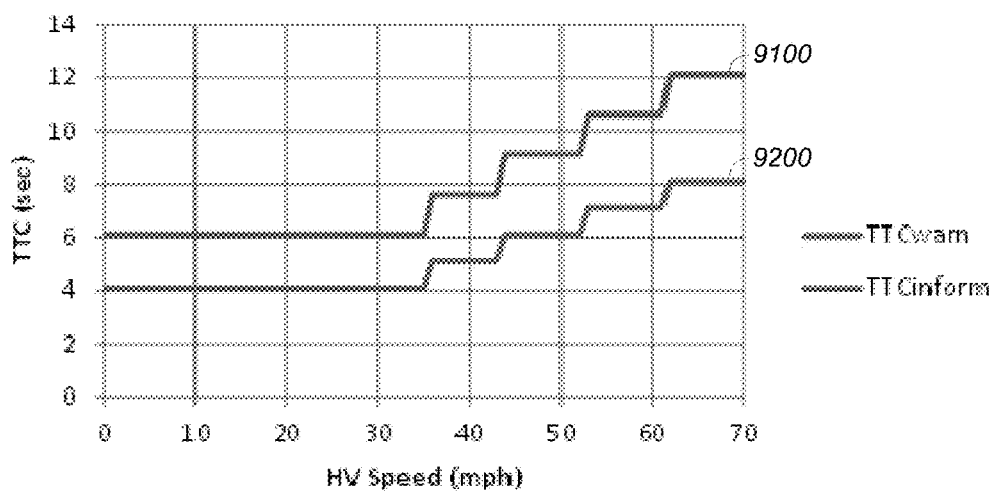
FIGS. 9A and 9B are graphs of a first threshold and a second threshold identified using the first, fixed deceleration with different minimum times at which a warning is issued and different multiplicative factors.
Figure 9B:
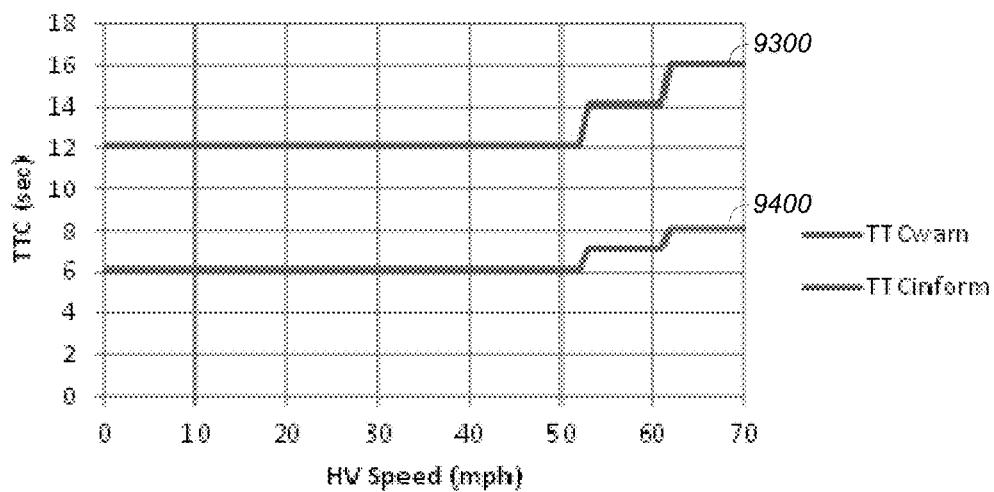

FIGS. 9A and 9B are graphs of a first threshold and a second threshold identified using the first, fixed deceleration with different minimum times at which a warning is issued and different multiplicative factors. FIG. 9A uses the first minimum time and the first multiplicative factor, and FIG. 9B uses the second minimum time and the first multiplicative factor. Using the equations, the system generates an informative threshold line 9100/9300 and a warning threshold line 9200/9400. The informative threshold line 9100/9300 represents the threshold for generating an informative alert/advisory in the host vehicle at different speeds. The warning threshold line 9200/9400 represents the threshold for generating a warning in the host vehicle at the different speeds.

In FIG. 9A, when the host vehicle is traveling at 20 mph, the informative threshold is 6 s and the warning threshold is 4 s. When the host vehicle is traveling at 60 mph, the informative threshold is 10.5 s and the warning threshold is 7 s. In FIG. 9B, when the host vehicle is traveling at 20 mph, the informative threshold is 12 s and the warning threshold is 6 s. When the host vehicle is traveling at 60 mph, the informative threshold is 14 s and the warning threshold at 7 s. As seen from the graphs, both the informative threshold line 9100 and the warning threshold line 9200 show that the thresholds begin increasing when the host vehicle is traveling at a lower speed (e.g., at about 35 mph), whereas the informative threshold line 9300 and the warning threshold line 9400 show that the thresholds do not begin increasing until traveling at a higher speed (e.g., at about 53 mph). In addition, and as demonstrated with FIGS. 7A and 7B, the rate of increase in the informative threshold as compared to the warning threshold increases with speed when a larger multiplicative factor is used.

Figure 10A:
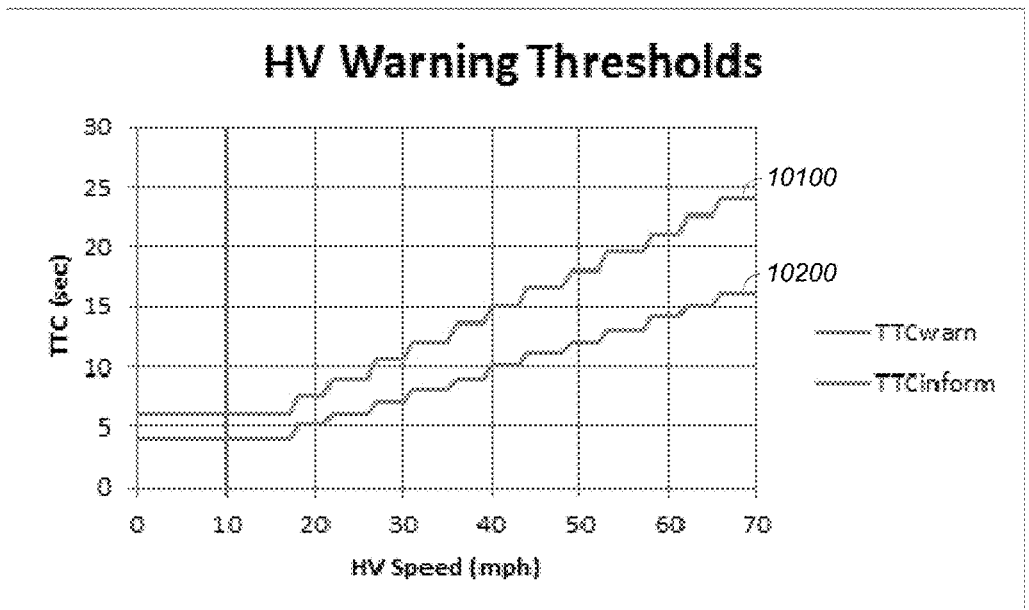
FIGS. 10A and 10B are graphs of a first threshold and a second threshold identified using a second, fixed deceleration and the first multiplicative factor with different minimum times at which a warning is issued.
Figure 10B:
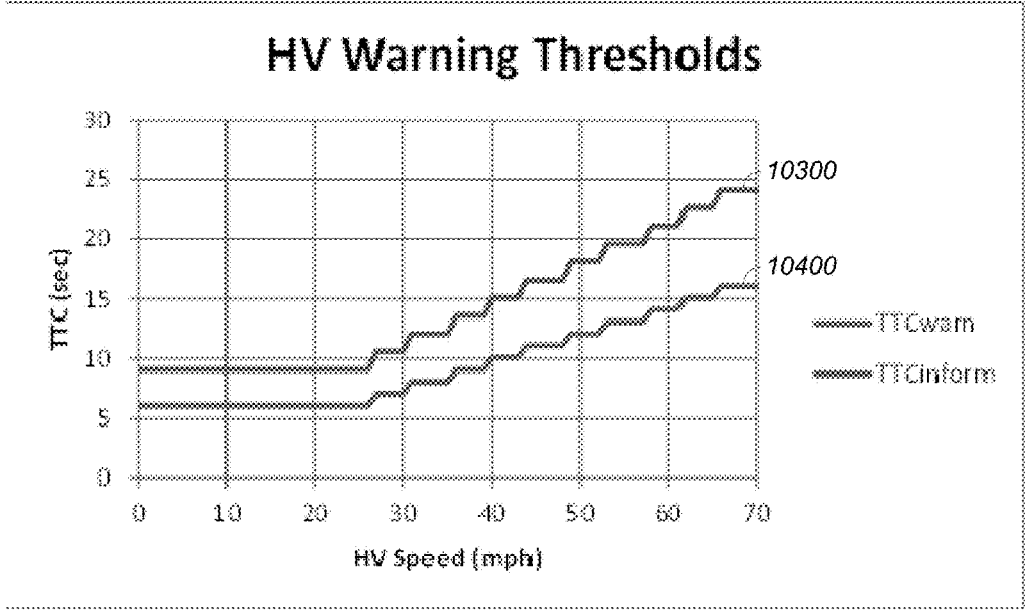

FIGS. 10A and 10B are graphs of a first threshold and a second threshold identified using a second, fixed deceleration and the first multiplicative factor with different minimum times at which a warning is issued. FIG. 10A uses the first minimum time, and FIG. 10B uses the second minimum time. Using the equations, the system generates an informative threshold line 10100/10300 and a warning threshold line 10200/10400. The informative threshold line 10100/10300 represents the threshold for generating an informative alert/advisory in the host vehicle at different speeds. The warning threshold line 10200/10400 represents the threshold for generating a warning in the host vehicle at the different speeds.

In FIG. 10A, when the host vehicle is traveling at 20 mph, the informative threshold is 7 s and the warning threshold is 5 s. When the host vehicle is traveling at 60 mph, the informative threshold is 21 s and the warning threshold is 14 s. In FIG. 10B, when the host vehicle is traveling at 20 mph, the informative threshold is 9 s and the warning threshold is 6 s. When the host vehicle is traveling at 60 mph, the informative threshold is 21 s and the warning threshold is 14 s. The graphs show that both the informative threshold lines 10100 and 10300 produce similar thresholds at higher speeds and that both the warning threshold lines 10200 and 10400 produce similar thresholds at higher speeds. The differences are more pronounced at lower speeds. In particular, the first and second thresholds in FIG. 10 begin increasing when the the host vehicle is traveling at a lower speed (e.g., under about 20 mph), whereas first and second thresholds in FIG. 10B do not begin increasing until the host vehicle is traveling at a slightly higher speed (e.g., just over 20 mph). For this reason, the informative threshold line 10300 and the warning threshold line 10400 increase at a less gradual rate than the informative threshold line 10100 and the warning threshold line 10200.

Figure 11A:
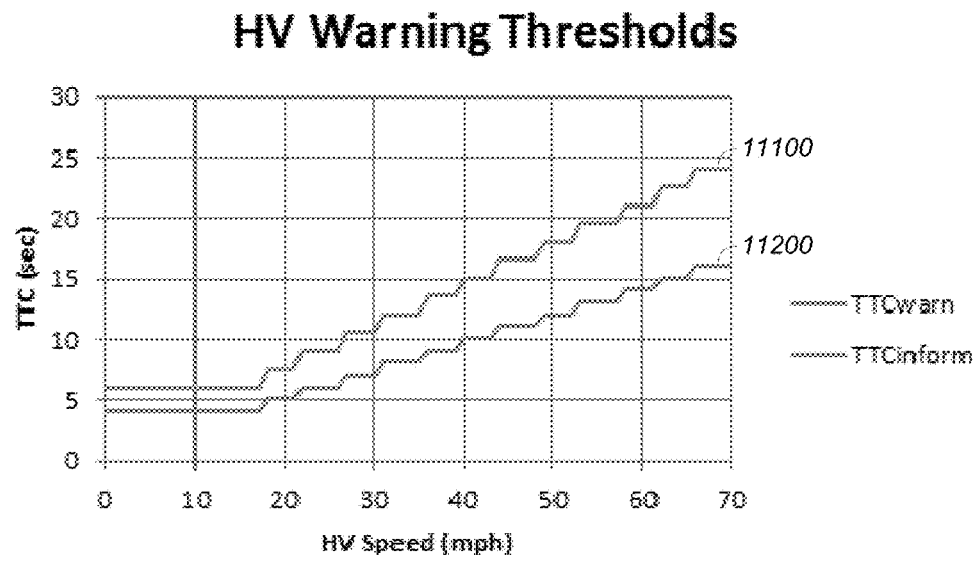
FIGS. 11A and 11B are graphs of a first threshold and a second threshold identified using the second, fixed deceleration and the first minimum time at which a warning is issued and with different multiplicative factors.
Figure 11B:
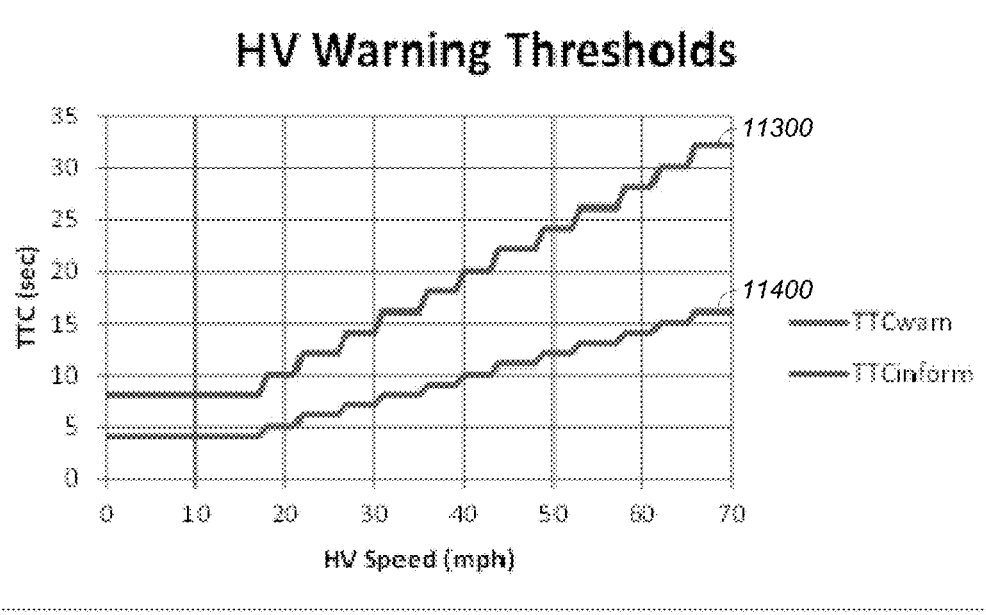

FIGS. 11A and 11B are graphs of a first threshold and a second threshold identified using the second, fixed deceleration and the first minimum time at which a warning is issued and with different multiplicative factors. FIG. 11A uses the first multiplicative factor, and FIG. 11B uses the second multiplicative factor. Using the equations, the system generates an informative threshold line 11100/11300 and a warning threshold line 11200/11400. The informative threshold line 11100/11300 represents the threshold for generating an informative alert/advisory in the host vehicle at different speeds. The warning threshold line 11200/11400 represents the threshold for generating a warning in the host vehicle at the different speeds.

In FIG. 11A, when the host vehicle is traveling at 20 mph, the informative threshold is 7 s and the warning threshold is 5 s. When the host vehicle is traveling at 60 mph, the informative threshold is 21 s and the warning threshold is 14 s. In FIG. 12B, when the host vehicle is traveling at 20 mph, the informative threshold is 6 s and the warning threshold is 4 s. When the host vehicle is traveling at 60 mph, the informative threshold is 10.5 s and the warning threshold is 7 s. The graphs show that the change in minimum time does not affect the result from previous graphs that the increase in multiplicative factor increases the difference in the two thresholds with speed. In each graph, the informative threshold line 11100/11300 and the warning threshold line 11200/11400 show that the thresholds begin increasing then the host vehicle is traveling at a speed of about 18 mph. The rate of increase in the informative threshold line 11300, and hence the threshold, is greater than that of the informative threshold line 11100 with speed. For example, in FIG. 11A, when a host vehicle is traveling at 20 mph, the difference between the two thresholds is 2 seconds and at 60 mph the difference between the two thresholds is 7 s. Contrastingly in FIG. 12B, when a host vehicle is traveling at 20 mph, the difference between the two thresholds is 5 seconds and at 60 mph the difference between the two thresholds is 14 s.

Figure 12A:
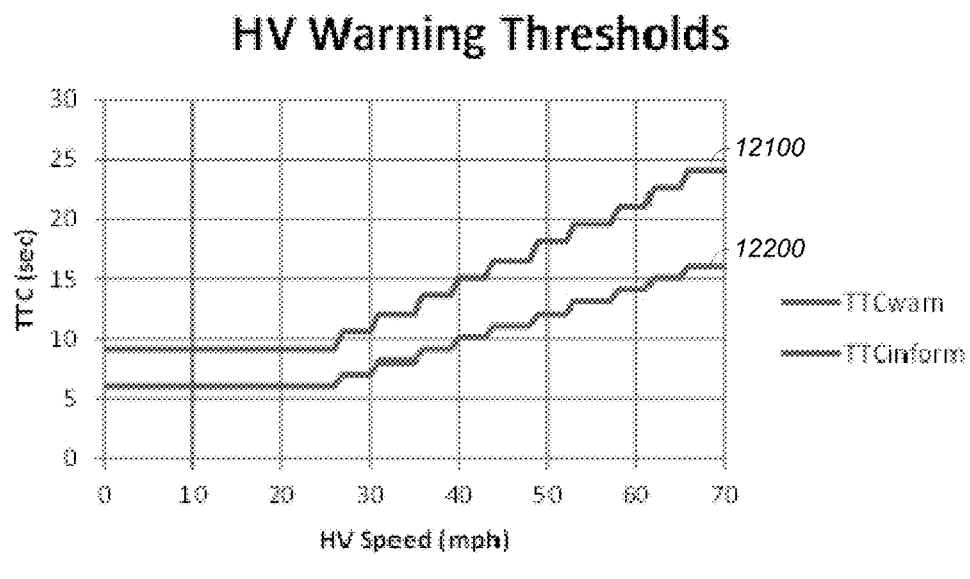
FIGS. 12A and 12B are graphs of a first threshold and a second threshold identified using the second, fixed deceleration and the second minimum time at which a warning time is issued with different multiplicative factors.
Figure 12B:
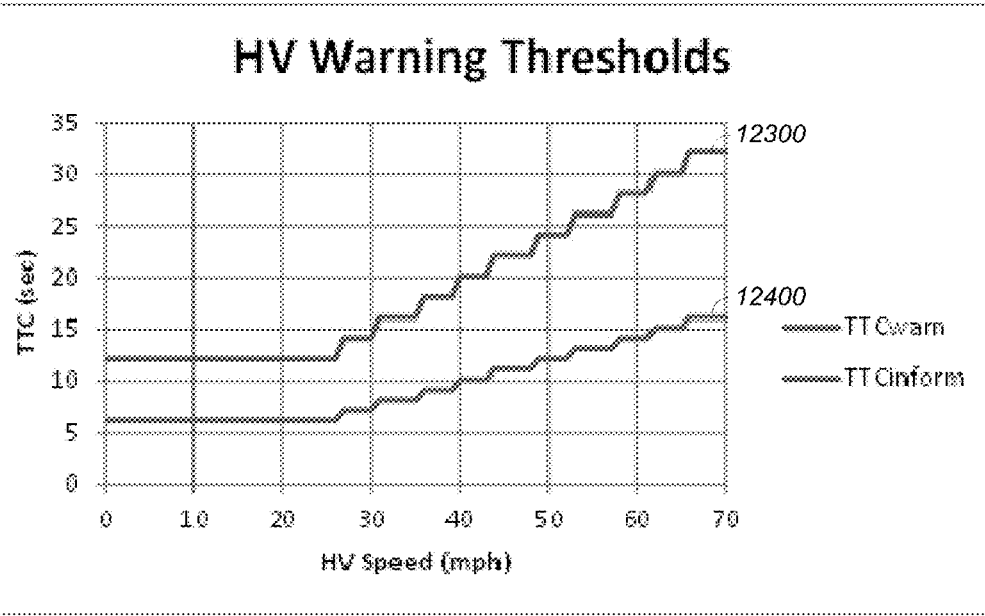

FIGS. 12A and 12B are graphs of a first threshold and a second threshold identified using the second, fixed deceleration and the second minimum time at which a warning time is issued with different multiplicative factors. FIG. 12A uses the first multiplicative factor, and FIG. 12B uses the second multiplicative factor. Using the equations, the system generates an informative threshold line 12100/12300 and a warning threshold line 12200/12400. The informative threshold line 12100/12300 represents the threshold for generating an informative alert/advisory in the host vehicle at different speeds. The warning threshold line 12200/12400 represents the threshold for generating a warning in the host vehicle at the different speeds.

In FIG. 12A, when the host vehicle is traveling at 20 mph, the informative threshold is 9 s and the warning threshold is 6 s. When the host vehicle is traveling at 60 mph, the informative threshold is 21 s and the warning threshold is 14 s. In FIG. 12B, when the host vehicle is traveling at 20 mph, the informative threshold is 12 s and the warning threshold is 6 s. When the host vehicle is traveling at 60 mph, the informative threshold is 28 s and the warning threshold is 14 s. The graphs show that both the informative threshold and the warning threshold do not begin increasing until the host vehicle is traveling at a relatively low speed (e.g., at about 25 mph). In addition, and as demonstrated with FIGS. 11A and 11B, the rate of increase in the informative threshold as compared to the warning threshold increases with speed when a larger multiplicative factor is used.

Figure 13A:
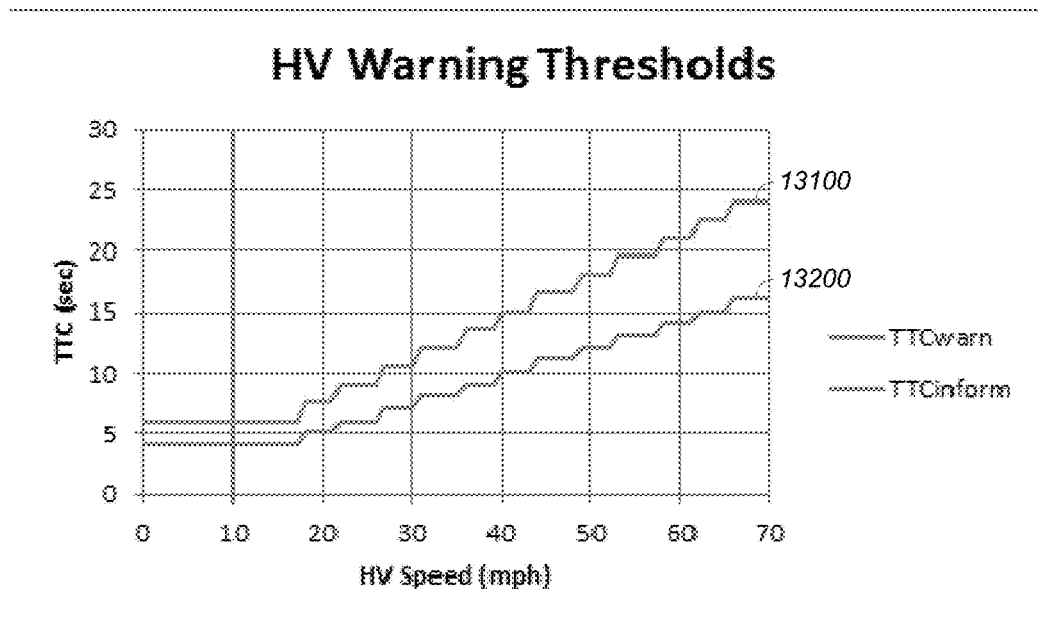
FIGS. 13A and 13B are graphs of a first threshold and a second threshold identified using the second, fixed deceleration with different minimum times at which a warning is issued and with different multiplicative factors.
Figure 13B:
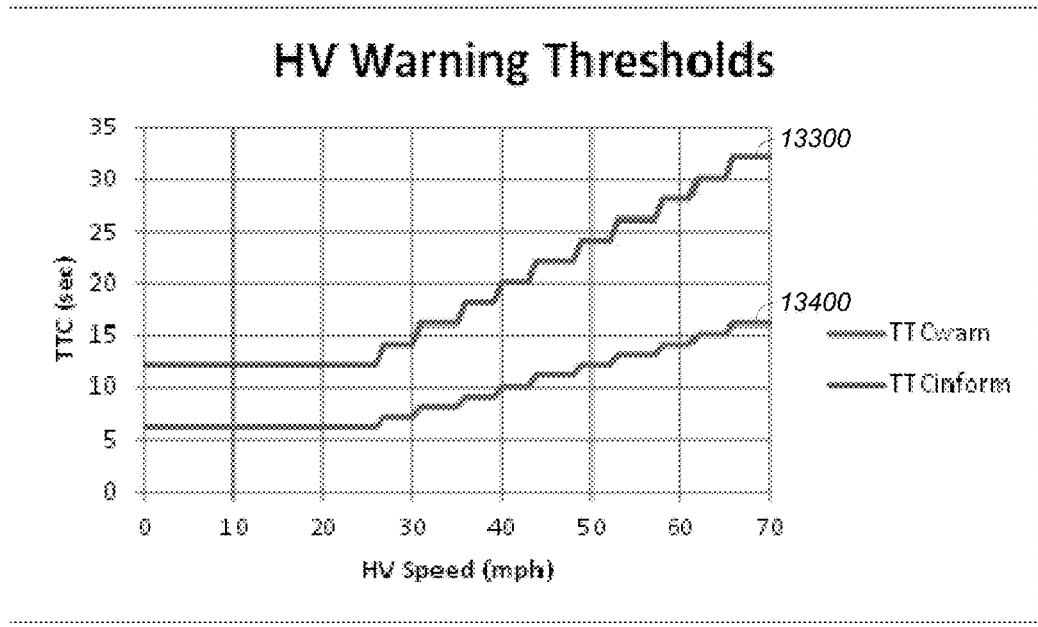

FIGS. 13A and 13B are graphs of a first threshold and a second threshold identified using the second, fixed deceleration with different minimum times at which a warning is issued and with different multiplicative factors. FIG. 13A uses the first minimum time and the first multiplicative factor, and FIG. 13B uses the second minimum time and the first multiplicative factor. Using the equations, the system generates an informative threshold line 13100/13300 and a warning threshold line 13200/13400. The informative threshold line 13100/13300 represents the threshold for generating an informative alert/advisory in the host vehicle at different speeds. The warning threshold line 13200/13400 represents the threshold for generating a warning in the host vehicle at the different speeds.

In FIG. 13A, when the host vehicle is traveling at 20 mph, the informative threshold is 7 s and the warning threshold is 5 s. When the host vehicle is traveling at 60 mph, the informative threshold is 21 s and the warning threshold is 14 s. In FIG. 13B, when the host vehicle is traveling at 20 mph, the informative threshold is 12 s and the warning threshold is 6 s. When the host vehicle is traveling at 60 mph, the informative threshold is 28 s and the warning threshold is 14 s. As seen from the graphs, both the informative threshold line 13100 and the warning threshold line 13200 show that the thresholds begin increasing when the host vehicle is traveling at a relatively low speed (e.g., under 20 mph), whereas the informative threshold line 13300 and the warning threshold line 13400 show that the thresholds do not begin increasing until traveling at slightly higher speed (e.g., at about 26 mph). In addition, and as demonstrated with FIGS. 11A and 11B, the rate of increase in the informative threshold as compared to the warning threshold increases with speed when a larger multiplicative factor is used.

The step function produces informative threshold lines and warning threshold lines using the first, fixed deceleration that have fewer and longer intervals than those produced using the second, fixed deceleration. For example, comparing the graphs in FIGS. 6A and 6B to the graphs in FIGS. 10A and 10B, the threshold increases with speed as the fixed deceleration decreases. In other words, a decrease in the fixed deceleration (e.g., from 0.4 g to 0.2 g of force) results in a more gradual decrease in speed of the host vehicle used to bring the host vehicle to a stop at or before a converging location. Because the decrease in speed is more gradual, it takes more time for the host vehicle to come to a stop. Thus, the informative threshold and the warning threshold are generated earlier in a host vehicle having a lower fixed deceleration than in a host vehicle having a higher fixed deceleration. This results in modification of the vehicle operation earlier. In addition, because the threshold lines have a larger number of intervals when the fixed deceleration decreases, the alerts or other changes to the vehicle operation are generated at more precise times. Without such changes in the thresholds used to generate action, the operator of the host vehicle may perceive any alerts as nuisance alarms and ignore them, thus decreasing the effectiveness of the alerts.

Figure 14:
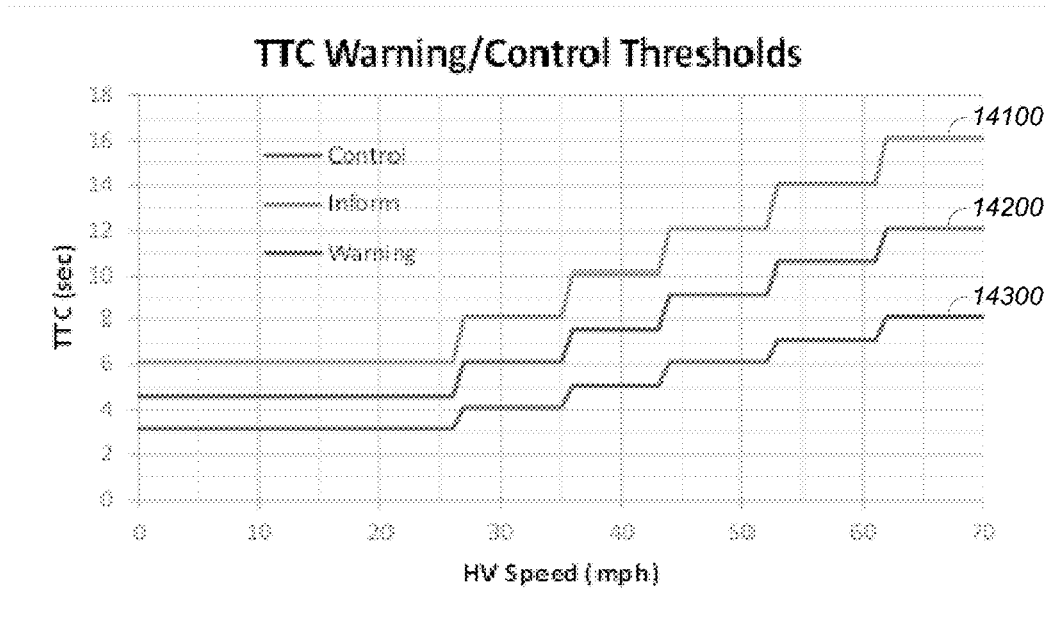
FIG. 14 is a graph of three thresholds identified according to the teachings herein.

FIGS. 6A-13B use examples of two thresholds. For illustrative purposes, the first and second thresholds are both used to modify the operation of the host vehicle by issuing alerts. However, the same relationships apply if one or both of the thresholds modify operation of the host vehicle by changes to its motive systems, e.g., its transmission system elements. Similar relationships between thresholds result when there are more than two thresholds. FIG. 14 is a graph of three thresholds identified according to the teachings herein. In this example, the thresholds are generated using the first, fixed deceleration. The multiplicative factor to generate the second threshold from the first threshold is 1.5, and the multiplicative factor to generate the third threshold from the first threshold is set so that the minimum time is equal to 3 seconds. Using the above equations, the system generates an informative threshold line 14100, a warning threshold line 14200, and a control threshold line 14300. The informative threshold line 14100 represents the second, informative threshold that may be used to generate an informative alert/advisory in the host vehicle at different speeds. The warning threshold line 14200 represents the first, warning threshold that may be used to generate a warning in the host vehicle at the different speeds. The control threshold line 14300 represents the third, control threshold that may be used to generate a control signal in the host vehicle at the different speeds, such that automatic braking decelerates the host vehicle for example.

In FIG. 14, when the host vehicle is traveling at 20 mph, the informative threshold is 6 s, the warning threshold is 4.5 s, and the control threshold is 3 s. When the host vehicle is traveling at 60 mph, the informative threshold is 14 s, the warning threshold is 10.5 s, and the control threshold is 7 s. In this graph, each of the thresholds begins increasing above its minimum threshold value when the host vehicle reaches a traveling speed of about 25 mph. In operation as the host vehicle approaches a converging location at a speed of 30 mph, the operation of the host vehicle is modified by the issuance of an informative alert/advisory 8 s before the converging location. If the host vehicle continues to approach the converging location without changes in speed or trajectory, etc., then the operation of the host vehicle is modified by the issuance of a warning 4.5 seconds before the converging location. If the host vehicle continues to approach the converging location without changes in speed or trajectory, etc., then the operation of the host vehicle is modified by the issuance of a control signal 3 seconds before the converging location. The control signal may cause an automatic braking system to decrease the speed of the host vehicle such that the host vehicle does not reach the converging location at the converging time. A third threshold may be implemented in any of the examples shown in FIGS. 6A-13B.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for operating a host vehicle, comprising:
receiving remote vehicle information indicating a geospatial state and a kinematic state for a remote vehicle;
identifying host vehicle information indicating a geospatial state and a kinematic state for the host vehicle;
determining a converging time to a converging location within a vehicle transportation network based on the remote vehicle information and the host vehicle information;
identifying a first threshold at which a fixed deceleration of the host vehicle to the converging location is achieved using a reaction delay of an operator of the host vehicle, wherein the first threshold is a step function based on the kinematic state of the host vehicle; and
modifying operation of the host vehicle responsive to the converging time reaching the first threshold.

2. The method of claim 1, wherein the first threshold is based on a minimum response time of the operator of the host vehicle, and the minimum response time is a predetermined value.

3. The method of claim 1, wherein the first threshold is based on a signal propagation delay of the host vehicle.

4. The method of claim 1, wherein the fixed deceleration is a predetermined value.

5. The method of claim 1, wherein the fixed deceleration is a learned value based on the host vehicle information gathered during operation by the operator of the host vehicle over time.

6. The method of claim 1, wherein the reaction delay of the operator is a predetermined value.

7. The method of claim 1, wherein the reaction delay is a learned value based on the reaction delay of the operator of the host vehicle over time.

8. The method of claim 1, wherein the first threshold produced by the step function is a fixed value for vehicle speeds below a first speed threshold and increases above the fixed value in a step-wise manner for speeds above the first speed threshold.

9. The method of claim 1, wherein modifying operation of the host vehicle comprises issuing a warning using at least one of an audio output device or a visual output device.

10. The method of claim 1, wherein determining a converging time comprises determining a plurality of converging times to the converging location as the host vehicle and the remote vehicle traverse the vehicle transportation network, the method further comprising:
identifying a second threshold at which the fixed deceleration of the host vehicle to the converging location is achieved using the reaction delay of the operator of the host vehicle, the second threshold being a function of the first threshold; and
modifying operation of the host vehicle responsive to the converging time reaching the second threshold.

11. The method of claim 10, wherein the second threshold TTC2 is identified according to an expression:

$$TTC2 = (TTC1 - \rho) \times \tau + \rho$$

wherein
TTC1 is the first threshold identified by the step function;
$\tau$ is a multiplicative factor defined by $0 < \tau \leq 2$; and
$\rho$ is a system signal propagation delay.

12. The method of claim 11, wherein the step function produces values for the first threshold equivalent to those output according to an expression:

$$TTC1 = \frac{TTC_{min}}{2} \times \left[ \frac{TTC_{min} - \lfloor \frac{V_0}{a_b} \rfloor - \sigma}{\left| TTC_{min} - \lfloor \frac{V_0}{a_b} \rfloor \right| + \sigma} + 1 \right] +$$

$$\frac{\lfloor \frac{V_0}{a_b} \rfloor}{2} \times \left[ \frac{\lfloor \frac{V_0}{a_b} \rfloor - TTC_{min} + \sigma}{\left| \lfloor \frac{V_0}{a_b} \rfloor - TTC_{min} \right| + \sigma} + 1 \right] + t_{rd} + \rho$$

wherein:
$TTC_{min}$ is a minimum time at which a warning or other operating instruction is issued;
$V_0$ is a speed of the host vehicle speed at a time the warning or other operating instruction is issued;
$a_b$ is the fixed deceleration;
$t_{rd}$ is the reaction delay; and
$\sigma$ is a value defined by $0 < \sigma \ll 1$.

13. The method of claim 1, wherein the step function produces values for the first threshold equivalent to those output according to an expression:

$$TTC = \frac{TTC_{min}}{2} \times \left[ \frac{TTC_{min} - \lfloor \frac{V_0}{a_b} \rfloor - \sigma}{\left| TTC_{min} - \lfloor \frac{V_0}{a_b} \rfloor \right| + \sigma} + 1 \right] +$$

$$\frac{\lfloor \frac{V_0}{a_b} \rfloor}{2} \times \left[ \frac{\lfloor \frac{V_0}{a_b} \rfloor - TTC_{min} + \sigma}{\left| \lfloor \frac{V_0}{a_b} \rfloor - TTC_{min} \right| + \sigma} + 1 \right] + t_{rd} + \rho$$

wherein:
TTC is the first threshold;
$TTC_{min}$ is a minimum time at which a warning or other operating instruction is issued;
$V_0$ is a speed of the host vehicle at a time the warning or other operating instruction is issued;
$a_b$ is the fixed deceleration;
$t_{rd}$ is the reaction delay;
$\rho$ is a system signal propagation delay; and
$\sigma$ is a value defined by $0 < \sigma \ll 1$.

14. A vehicle, comprising:
a transmission system;
a sensor; and
an operation system to operate the vehicle, the operation system configured to:

receive remote vehicle information indicating a geospatial state and a kinematic state for a remote vehicle;

identify, using the sensor, host vehicle information indicating geospatial state and kinematic state for the vehicle;

determine a converging time to a converging location within a vehicle transportation network based on the remote vehicle information and the host vehicle information;

identify a first threshold at which a fixed deceleration of the vehicle to the converging location is achieved using a reaction delay of an operator of the vehicle, wherein the first threshold is a step function based on the kinematic state of the vehicle; and modify operation of the vehicle responsive to the converging time reaching the first threshold.

15. The vehicle of claim 14, wherein the kinematic state of the vehicle comprises a speed of the vehicle, and the operation system is configured to modify operation of the vehicle responsive to the converging time reaching the first threshold by modifying a control signal to the transmission system.

16. The vehicle of claim 14, further comprising:
an audio output device; and
a visual output device; and wherein the operation system is configured to modify operation of the vehicle by generating a warning using at least one of the audio output device or the visual output device.

17. An apparatus for controlling a host vehicle, comprising:
a processor; and
memory storing instructions that cause the processor to perform a method comprising:
receiving remote vehicle information indicating a geospatial state and a kinematic state for a remote vehicle;
identifying host vehicle information indicating a geospatial state and a kinematic state for the host vehicle;
determining a converging time to a converging location within a vehicle transportation network based on the remote vehicle information and the host vehicle information;
identifying a first threshold at which a fixed deceleration of the host vehicle to the converging location is achieved using a reaction delay of an operator of the host vehicle, wherein the first threshold is a stepwise function based on the kinematic state of the host vehicle and a signal propagation delay of the host vehicle; and
modifying operation of the host vehicle responsive to the converging time reaching the first threshold.

18. The apparatus of claim 17, wherein determining a converging time comprises determining a plurality of converging times to the converging location as the host vehicle and the remote vehicle traverse the vehicle transportation network, the method further comprising:
identifying a second threshold at which the fixed deceleration of the host vehicle to the converging location is achieved using the reaction delay of the operator of the host vehicle, the second threshold being a function of the first threshold, and the second threshold being lower than the first threshold;
modifying operation of the host vehicle responsive to the converging time reaching the first threshold by signaling a warning perceptible to the operator; and
modifying operation of the host vehicle responsive to the converging time reaching the second threshold by causing deceleration using a braking system of the host vehicle.

19. The apparatus of claim 17, further comprising:
determining the fixed deceleration based on the host vehicle information gathered during operation by the operator of the host vehicle over time.

20. The apparatus of claim 17, wherein the first threshold is based on a minimum response time of the operator of the host vehicle and a speed of the host vehicle as the kinematic state of the host vehicle.

* * * * *